(12) United States Patent
Kim et al.

(10) Patent No.: US 9,801,169 B2
(45) Date of Patent: Oct. 24, 2017

(54) METHOD FOR TRANSMITTING CONTROL INFORMATION IN WIRELESS COMMUNICATION SYSTEM AND DEVICE THEREFOR

(75) Inventors: Hakseong Kim, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 324 days.

(21) Appl. No.: 14/115,297

(22) PCT Filed: May 3, 2012

(86) PCT No.: PCT/KR2012/003498
§ 371 (c)(1),
(2), (4) Date: Nov. 1, 2013

(87) PCT Pub. No.: WO2012/150836
PCT Pub. Date: Nov. 8, 2012

(65) Prior Publication Data
US 2014/0092792 A1 Apr. 3, 2014

Related U.S. Application Data

(60) Provisional application No. 61/482,180, filed on May 3, 2011.

(51) Int. Cl.
*H04W 72/04* (2009.01)
*H04L 5/00* (2006.01)
(Continued)

(52) U.S. Cl.
CPC ......... *H04W 72/042* (2013.01); *H04L 5/0007* (2013.01); *H04L 5/0023* (2013.01);
(Continued)

(58) Field of Classification Search
CPC ....... H04L 5/22; H04L 5/0053; H04L 5/0007; H04L 5/0035; H04L 5/0023;
(Continued)

(56) References Cited

U.S. PATENT DOCUMENTS 8,588,246 B2 11/2013 Li et al.
2009/0046582 A1* 2/2009 Sarkar .................. H04B 7/043
370/230.1
(Continued)

FOREIGN PATENT DOCUMENTS

CN 101388760 A 3/2009
CN 101754230 A 6/2010
(Continued)

OTHER PUBLICATIONS

3GPP TR 36.922 version 9.1.0 Release 9, "LTE; Evolved Universal Terrestrial Radio Access (E-UTRA); TDD Home eNode B (HeNB) Radio Frequency (RF) requirements analysis", Jul. 2010.*
(Continued)

*Primary Examiner* — Charles C Jiang
*Assistant Examiner* — Rose Clark
(74) *Attorney, Agent, or Firm* — Birch, Stewart, Kolasch & Birch, LLP

(57) ABSTRACT

The present invention relates to a wireless communication system. In particular, the present invention relates to a method for receiving a downlink control channel in a wireless communication system, and a device therefore, more particularly, to the method and a device therefore, the method comprising the steps of: receiving an upper layer signal including a plurality of frequency resource sets; receiving a subframe carrying a plurality of downlink control channel candidates; and monitoring the plurality of control channel candidates in one specific frequency resource set from the plurality of frequency resource sets, for
(Continued)

the downlink control channel, wherein the one specific frequency resource set is determined according to the type or the characteristic of the subframe.

8 Claims, 22 Drawing Sheets

(51) Int. Cl.
H04L 5/14 (2006.01)
H04L 27/26 (2006.01)

(52) U.S. Cl.
CPC .......... *H04L 5/0048* (2013.01); *H04L 5/0053* (2013.01); *H04L 5/0073* (2013.01); *H04L 5/0091* (2013.01); *H04L 5/143* (2013.01); *H04L 5/1469* (2013.01); *H04L 27/2666* (2013.01)

(58) Field of Classification Search
CPC ..... H04L 5/0094; H04L 5/0055; H04L 5/001; H04L 5/0073; H04L 5/143; H04L 27/2666; H04L 5/1469; H04L 5/0048; H04L 5/0091; H04L 5/14; H04W 72/1278; H04W 72/042; H04W 72/0446; H04W 72/04; H04W 72/0426; H04W 99/00; H04W 72/0406; H04W 72/1289; H04W 16/14; H04W 56/00; H04W 56/003; H04W 72/00; H04W 84/047; H04B 7/14; H04B 7/155
USPC ....... 370/329, 328, 280, 330, 336, 252, 315; 455/422.1
See application file for complete search history.

(56) References Cited

U.S. PATENT DOCUMENTS

| | | | | |
|---|---|---|---|---|
| 2009/0274109 | A1* | 11/2009 | Zhang | H04L 1/1614 370/329 |
| 2010/0034158 | A1 | 2/2010 | Meylan | |
| 2010/0111107 | A1 | 5/2010 | Han et al. | |
| 2010/0238845 | A1* | 9/2010 | Love | H04B 7/15528 370/280 |
| 2010/0290376 | A1* | 11/2010 | Dai | H04L 5/0007 370/294 |
| 2010/0331030 | A1* | 12/2010 | Nory | H04L 5/0053 455/509 |
| 2011/0075624 | A1* | 3/2011 | Papasakellariou | H04L 5/0053 370/329 |
| 2011/0090808 | A1* | 4/2011 | Chen | H04B 7/15542 370/252 |
| 2011/0170458 | A1* | 7/2011 | Chen | H04B 7/2606 370/279 |
| 2011/0170496 | A1* | 7/2011 | Fong | H04L 5/0053 370/329 |
| 2011/0211595 | A1* | 9/2011 | Geirhofer | H04B 7/2606 370/478 |
| 2011/0261769 | A1* | 10/2011 | Ji | H04L 5/0007 370/329 |
| 2012/0020256 | A1* | 1/2012 | Tujkovic | H04W 16/14 370/278 |
| 2012/0188877 | A1* | 7/2012 | Chin | H04W 24/10 370/241 |
| 2012/0294225 | A1* | 11/2012 | Awad | H04B 7/15528 370/315 |
| 2013/0058264 | A1* | 3/2013 | Gan | H04B 7/155 370/279 |

FOREIGN PATENT DOCUMENTS

| | | |
|---|---|---|
| CN | 101868033 A | 10/2010 |
| EP | 2 360 984 A1 | 8/2011 |
| KR | 10-2011-0044902 A | 5/2011 |
| WO | WO 2010/039738 A2 | 4/2010 |
| WO | WO 2010/111194 A1 | 9/2010 |
| WO | WO 2010/138925 A1 | 12/2010 |
| WO | WO 2011/023117 A1 | 3/2011 |

OTHER PUBLICATIONS

Rohde & Schwarz, CMCC, "Discussion about TDD special subframe configuration," 3GPP TSG RAN WG R5 Meeting #43bis, R5-093400, Jun. 23-26, 2009, Beijing, China.

3GPP, "3rd Generation Partnership Project; Technical Specification Group Radio Access Network; Evolved Universal Terrestrial Radio Access (E-UTRA); Physical Channels and Modulation (Release 9)", 3GPP TS 36.211, V9.1.0, Mar. 2010, 84 pages.

3GPP, "3rd Generation Partnership Project; Technical Specification Group Radio Access Network; Evolved Universal Terrestrial Radio Access (E-UTRA); TDD Home eNode B (HeNB) Radio Frequency (RF) requirements analysis (Release 9)", 3GPP TR 36.922, V9.1.0, Jun. 2010, pp. 1-74.

* cited by examiner

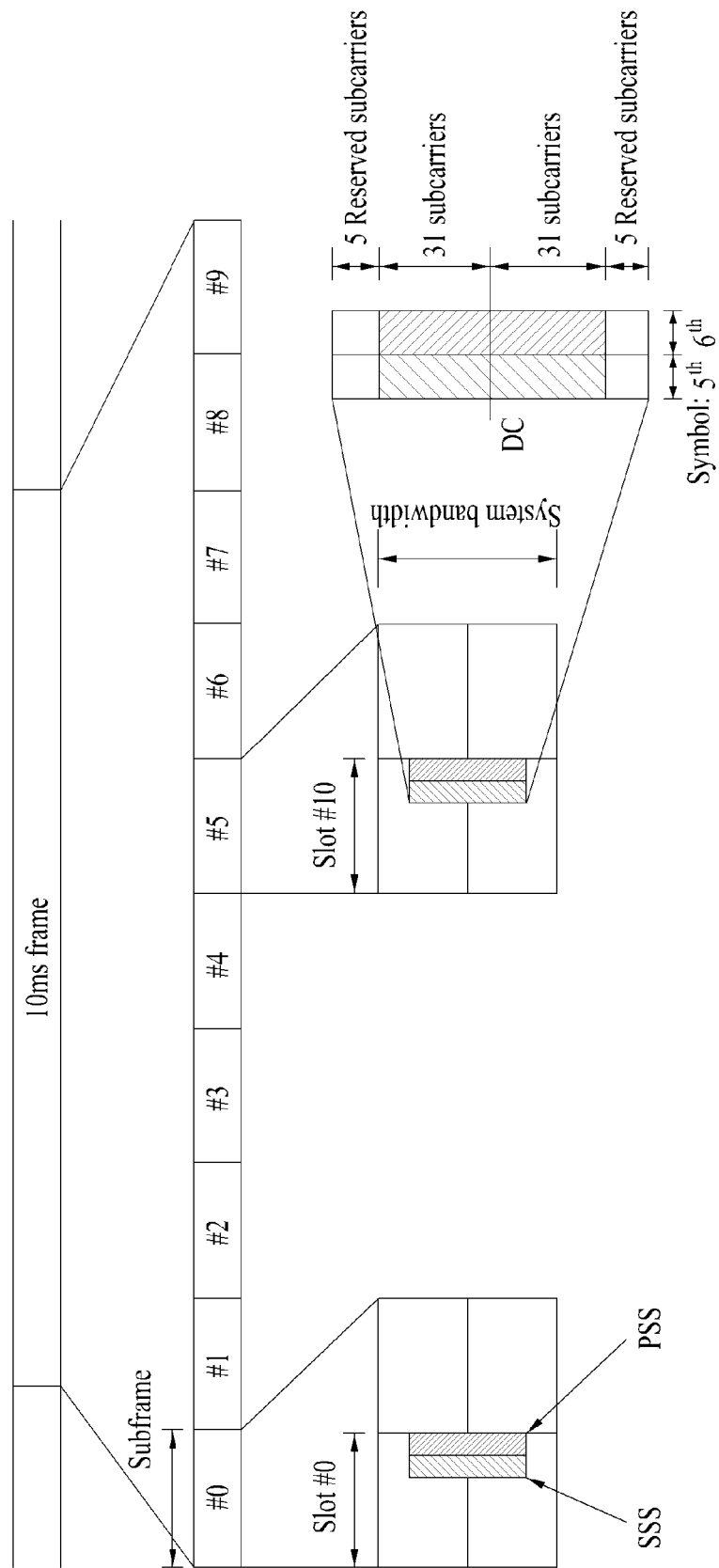

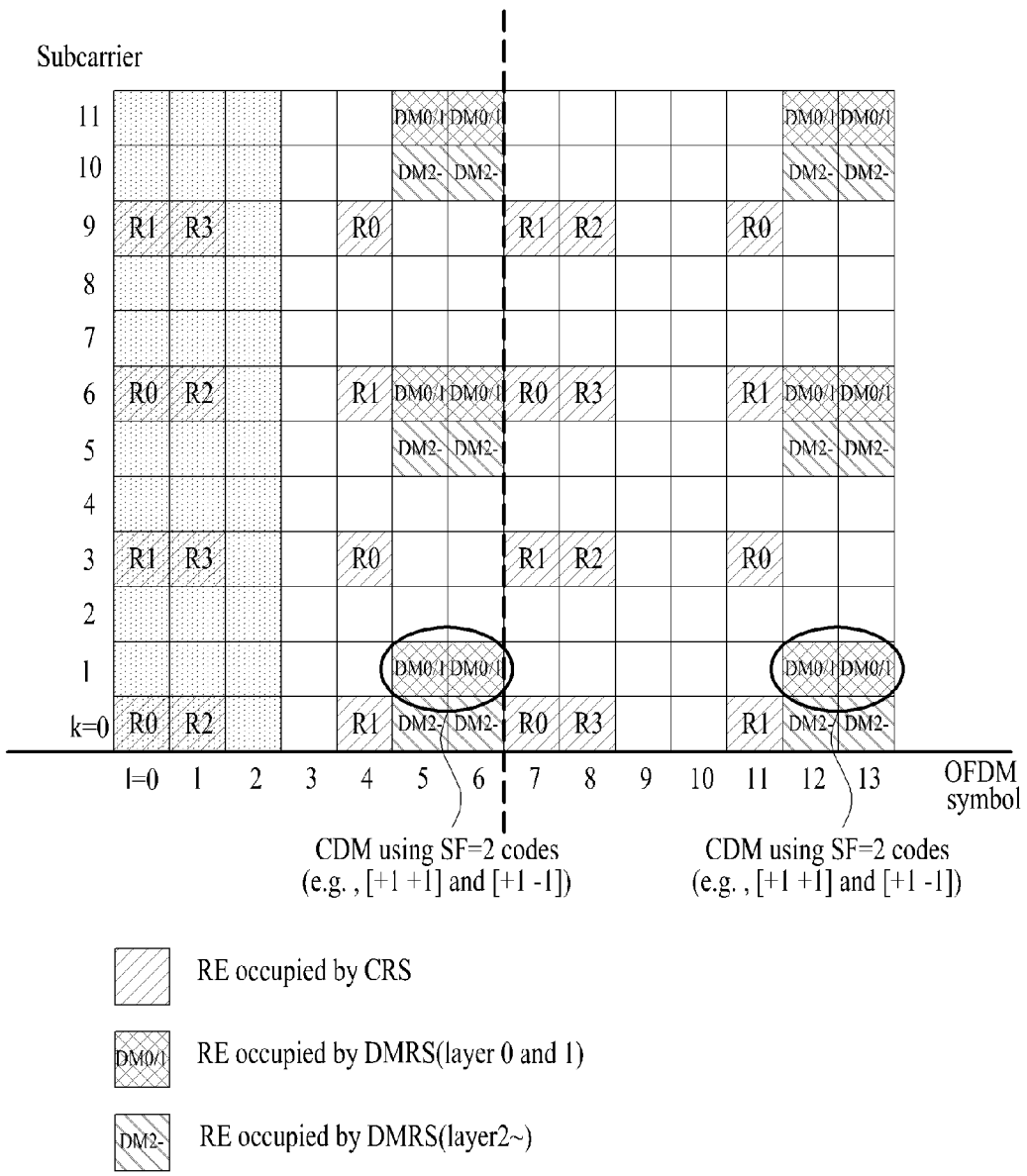

UE-specific reference signals for antenna ports 7, 8, 9 and 10 (normal CP),
(special subframe configurations 1, 2, 6 and 7)

UE-specific reference signals for antenna ports 7, 8, 9 and 10 (normal CP),
(special subframe configurations 3, 4 and 8)

UE-specific reference signals for antenna ports 7, 8, 9 and 10 (normal CP), (other downlink subframes)

UE-specific reference signal for antenna ports 7, 8, 9 and 10 (extended CP),
(special subframe configurations 1, 2, 3, 5 and 6)

UE-specific reference signal for antenna ports 7, 8, 9 and 10 (extended CP),
(other downlink subframes)

METHOD FOR TRANSMITTING CONTROL INFORMATION IN WIRELESS COMMUNICATION SYSTEM AND DEVICE THEREFOR

CROSS REFERENCE TO RELATED APPLICATIONS

This application is the National Phase Of PCT/KR2012/0034498 filed on May 3, 2012, which claims priority under 35 U.S.C. 119(e) to U.S. Provisional Application No. 61/482,180 filed on May 3, 2011, all of which are hereby expressly incorporated by reference into the present application.

TECHNICAL FIELD

The present invention relates to a wireless communication system, and more specifically, to a method and device for transmitting control information. The wireless communication system includes a system operating in time division duplex (TDD) mode.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

DISCLOSURE

Technical Problem

An object of the present invention devised to solve the problem lies in a method and device for efficiently transmitting control information in a wireless communication system. Another object of the present invention is to provide a channel format, a resource allocation method, and a signal processing method and a device therefor to efficiently transmit control information. Another object of the present invention is to provide a method for efficiently allocating resources for transmitting control information and a device therefor.

The technical problems solved by the present invention are not limited to the above technical problems and those skilled in the art may understand other technical problems from the following description.

Technical Solution

The object of the present invention can be achieved by providing a method for receiving a downlink control channel in a wireless communication system, including: receiving a higher layer signal including a plurality of frequency resource sets; receiving a subframe carrying a plurality of downlink control channel candidates; and monitoring the plurality of downlink control channel candidates within a specific frequency resource set from among the plurality of frequency resources sets for the downlink control channel, wherein the specific frequency resource set is determined according to the type or characteristics of the subframe.

In another aspect of the present invention, provided herein is a communication device configured to receive a downlink control channel in a wireless communication system, including: a radio frequency (RF) unit; and a processor, wherein the process is configured to receive a higher layer signal including a plurality of frequency resource sets, to receive a subframe carrying a plurality of downlink control channel candidates and to monitor the plurality of downlink control channel candidates within a specific frequency resource set from among the plurality of frequency resources sets for the downlink control channel, wherein the specific frequency resource set is determined according to the type or characteristics of the subframe.

A first frequency resource set may be used when a predetermined control channel signal is present in the subframe, a second frequency resource set may be used when the predetermined control channel signal is not present in the subframe, and the first frequency resource set may be configured such that a plurality of RBs is not included in the same on the basis of a center frequency.

The predetermined control channel signal may include at least one of a primary synchronization (P-SCH) signal, a secondary synchronization (S-SCH) signal and a physical broadcast channel (P-BCH) signal.

The plurality of RBs may include a frequency resource within which the predetermined control channel signal is present.

A first frequency resource set may be used when the subframe corresponds to a special subframe defined in a time division duplex (TDD) radio frame, a second frequency resource set may be used when the subframe corresponds to a non-special subframe defined in the TDD radio frame, and the first frequency resource set may be configured such that a plurality of RBs is not included in the same on the basis of a center frequency.

The plurality of control channel candidates may be present in orthogonal frequency division multiplexing (OFDM) symbols #A and #B within the subframe, wherein the OFDM symbol #A corresponds to a second or following OFDM symbol in the first slot of the subframe and the OFDM symbol #B corresponds to an OFDM symbol in the second slot of the subframe.

ADVANTAGEOUS EFFECTS

According to the present invention, it is possible to efficiently transmit control information in a wireless communication system. In addition, it is possible to provide a channel format, a resource allocation method and a signal processing method for efficiently transmitting control information. Furthermore, it is possible to efficiently allocate resources for transmitting control information and a device therefor.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIGS. 6 and 7 illustrate a physical broadcast channel (PBCH) and a synchronization channel (SCH);

FIG. 8 illustrates a downlink reference signal (RS) pattern;

BEST MODE

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3$^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is the next generation of 3GPP LTE. While the following description is given, centering on 3GPP LTE/LTE-A for clarity, this is purely exemplary and thus should not be construed as limiting the present invention.

In a wireless communication system, a UE receives information from a BS through downlink (DL) and transmits information to the BS through uplink (UL). Information transmitted/received between the UE and BS includes data and various types of control information, and various physical channels are present according to type/purpose of information transmitted/received between the UE and BS.

Figure 1:
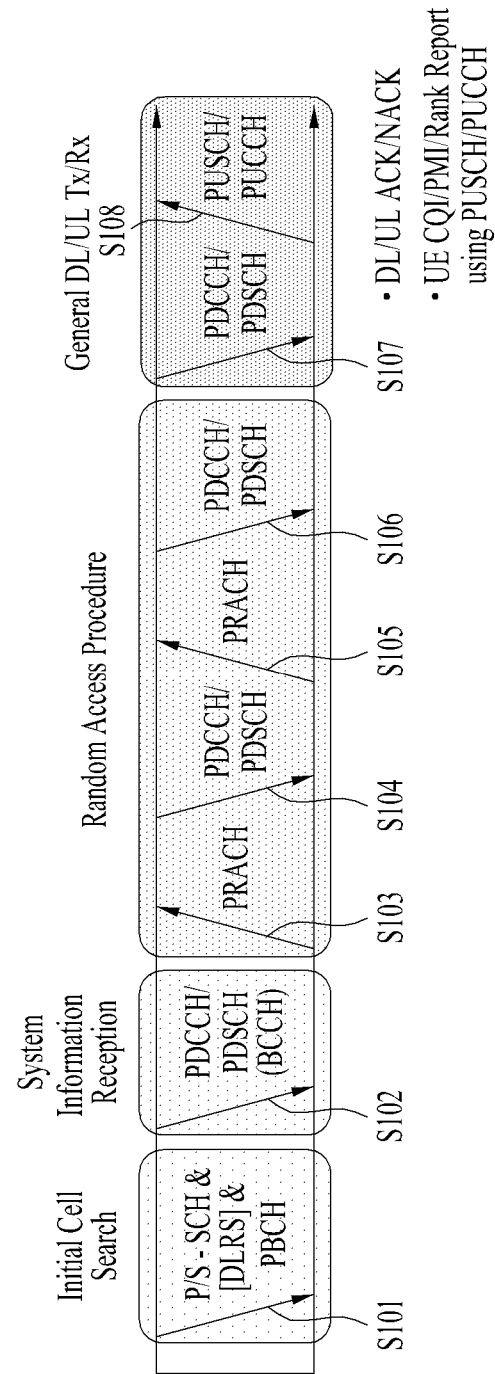
FIG. 1 illustrates physical channels used in a 3GPP LTE system as an exemplary wires communication system and a signal transmission method using the same.

FIG. 1 illustrates physical channels used in a 3GPP LTE system and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a Primary Synchronization Channel (P-SCH) and a Secondary Synchronization Channel (S-SCH) from the BS. Then the UE may receive broadcast information from the cell on a Physical Broadcast Channel (PBCH). In the mean time, the UE may determine a downlink channel status by receiving a Downlink Reference Signal (DL-RS) during initial cell search.

After initial cell search, the UE may acquire more specific system information by receiving a Physical Downlink Control Channel (PDCCH) and receiving a Physical Downlink Shared Channel (PDSCH) based on information of the PDCCH in step S102.

The UE may perform a random access procedure to access the BS in steps S103 to S106. For random access, the UE may transmit a preamble to the BS on a Physical Random Access Channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a Physical Uplink Shared Channel (PUSCH)/Physical Uplink Control Channel (PUCCH) (S108), as a general downlink/uplink signal transmission procedure. Here, control information transmitted from the UE to the BS is called uplink control information (UCI). The UCI may include a hybrid automatic repeat and request (HARQ) acknowledgement(ACK)/negative-ACK (HARQ ACK/NACK) signal, a scheduling request (SR), channel state information (CSI), etc. The CSI includes a channel quality indicator (CQI), a precoding matrix index (PMI), a rank indicator (RI), etc. While the UCI is transmitted through a PUCCH in general, it may be transmitted through a PUSCH when control information and traffic data need to be simultaneously transmitted. The UCI may be aperiodically transmitted through a PUSCH at the request/instruction of a network.

Figure 2:
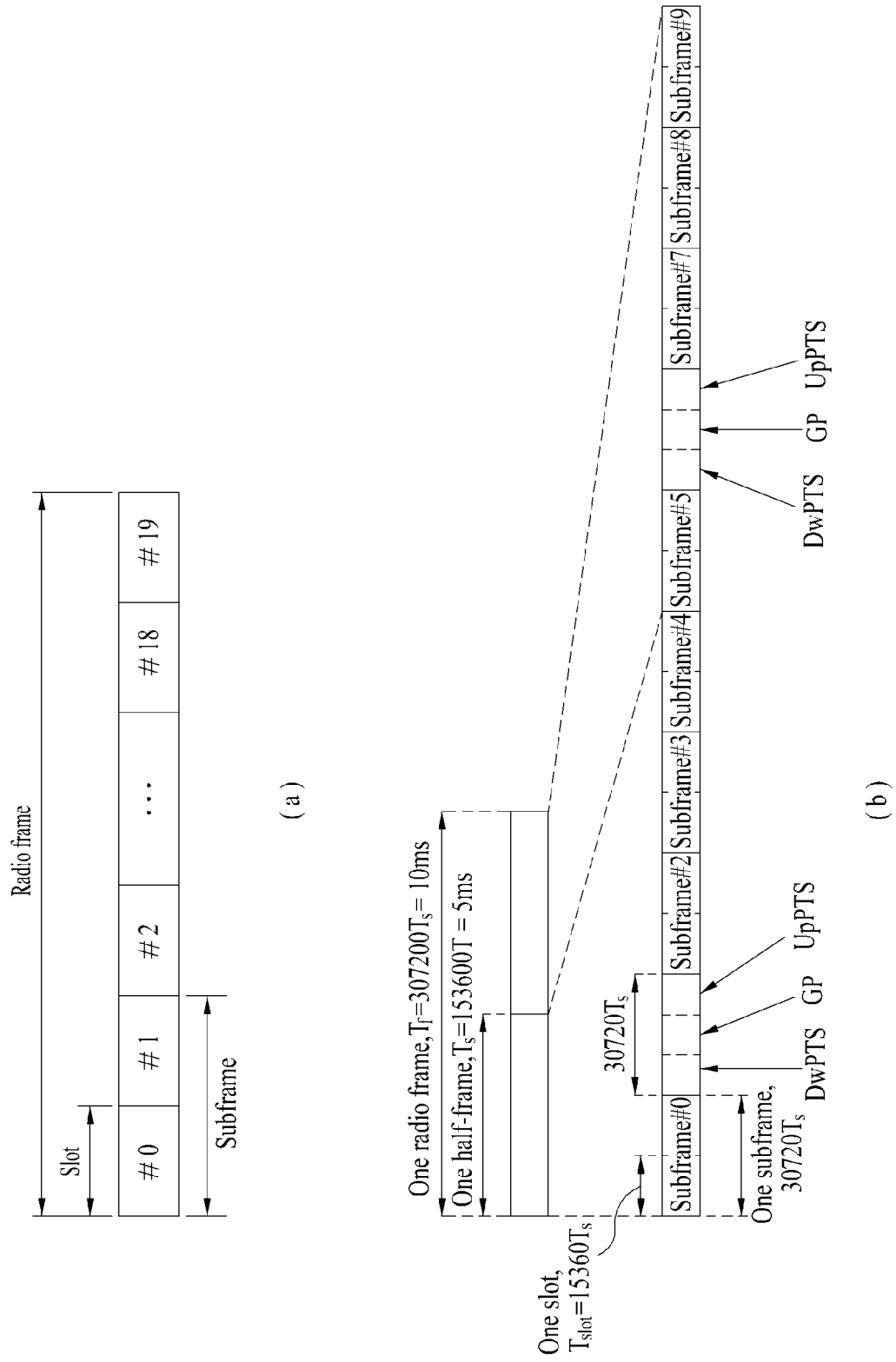
FIG. 2 illustrates a radio frame structure.

FIG. 2 illustrates a radio frame structure. In a cellular OFDM wireless packet communication system, uplink/downlink data packet transmission is performed on a subframe-by-subframe basis. A subframe is defined as a predetermined time interval including a plurality of OFDM symbols. 3GPP LTE supports a type-1 radio frame structure applicable to FDD (Frequency Division Duplex) and a type-2 radio frame structure applicable to TDD (Time Division Duplex).

FIG. 2(a) illustrates a type-1 radio frame structure. A downlink subframe includes 10 subframes each of which includes 2 slots in the time domain. A time for transmitting a subframe is defined as a transmission time interval (TTI). For example, each subframe has a length of 1 ms and each slot has a length of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

FIG. 2(b) illustrates a type-2 radio frame structure. The type-2 radio frame includes 2 half frames. Each half frame includes 5 subframes, a Downlink Pilot Time Slot (DwPTS), a Guard Period (GP), and an Uplink Pilot Time Slot (UpPTS), and one subframe consists of 2 slots. The DwPTS is used for initial cell search, synchronization or channel estimation. The UpPTS is used for channel estimation in a BS and UL transmission synchronization acquisition in a UE. The GP eliminates UL interference caused by multipath delay of a DL signal between a UL and a DL.

Figure 3:
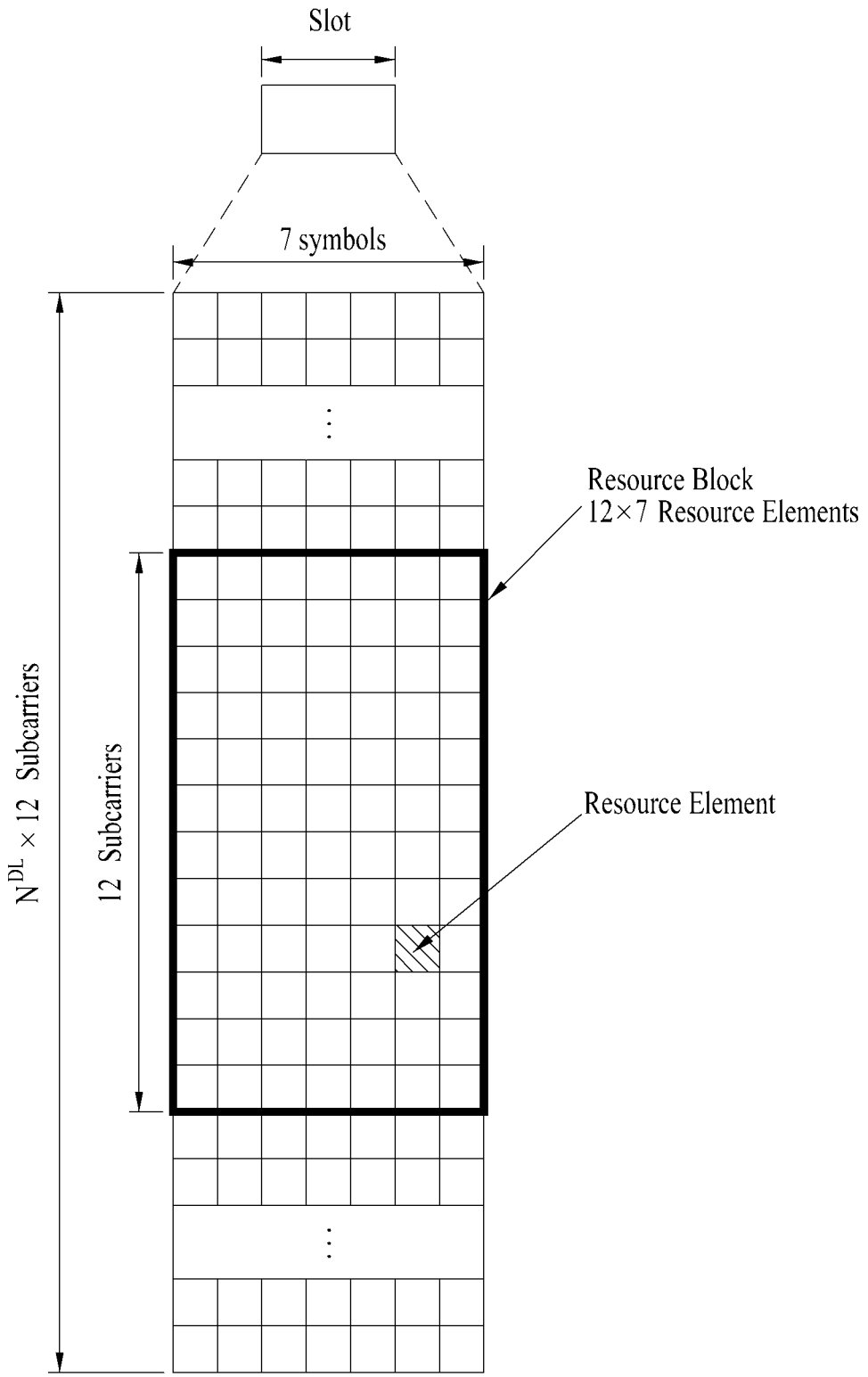
FIG. 3 illustrates a resource grid of a downlink slot.

FIG. 3 illustrates a resource grid of a downlink slot.

Referring to FIG. 3, a downlink slot includes a plurality of OFDM symbols in the time domain. The number of OFDM symbols included per slot may depend on cyclic prefix (CP) configuration. When an OFDM symbol is configured with the normal CP, for example, the number of OFDM symbols included in one slot may be 7. When an OFDM symbol is configured with the extended CP, the number of OFDM symbols included per slot may be 6. When a channel state is unstable, such as when a UE moves at a high speed, the extended CP can be used to reduce inter-symbol interference. FIG. 3 illustrates a case in which one downlink slot includes 7 OFDM symbols and one resource block (RB) includes 12 subcarriers in the frequency domain. Each element on the resource grid is referred to as a resource element (RE). One RB may include 12×7 REs. The number $N_{RB}$ of RBs included in the downlink slot depends on downlink transmit bandwidth. The structure of an uplink slot may be equal to that of the downlink slot.

Figure 4:
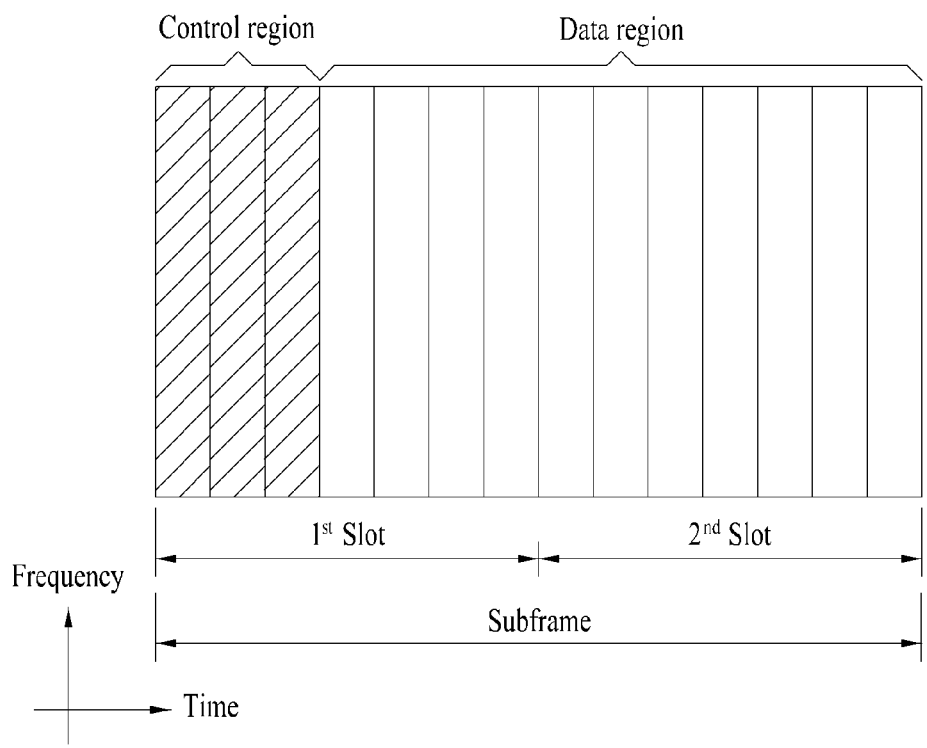
FIG. 4 illustrates a downlink subframe structure.

FIG. 4 illustrates a downlink slot structure.

Referring to FIG. 4, a maximum of 3 (4) OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response to uplink transmission and carries a HARQ acknowledgment (ACK)/negative-acknowledgment (NACK) signal. Control information transmitted through the PDCCH is referred to as downlink control information (DCI). DCI includes uplink or downlink scheduling information or an uplink transmit (Tx) power control command for an arbitrary UE group.

A PDCCH carries a message known as DCI and DCI includes resource allocation information and control information for a UE or UE group. Specifically, the PDCCH carries a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A BS determines a PDCCH format according to DCI to be transmitted to a UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). One REG corresponds to 4 neighboring REs in one OFDM symbol. A PDCCH format and the number of bits of the available PDCCH are determined by a correlation between the number of CCEs and a coding rate provided by CCEs.

Table 1 shows the relationship among a CCE, a REG and a PDCCH according to PDCCH format.

TABLE 1

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

A UE monitors a plurality of PDCCH candidates within a control region to detect a PDCCH assigned thereto. Here, monitoring includes blind decoding (BD). In LTE(-A), to reduce decoding load of the UE, resources (i.e. a CCE set) in which the plurality of PDCCH candidates can be positioned are limited for the UE. Limited resources that the UE needs to monitor in order to detect the PDCCH allocated thereto may be referred to as 'search space (SS)'. In LTE(-A), the search space has a size depending on PDCCH format. In addition, UE-specific and UE-common search spaces are defined. The UE-specific search space is individually set for each UE, whereas the UE-common search space is known to all UEs. The UE-specific and UE-common search spaces may overlap for a predetermined UE. Sizes of the UE-specific and UE-common search spaces are shown in Table 2.

TABLE 2

| PDCCH format | Number of CCEs (n) | Number of candidates in UE-common SS | Number of candidates in UE-specific SS |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the UE-specific search space. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the UE-common search space. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier.

Figure 5:
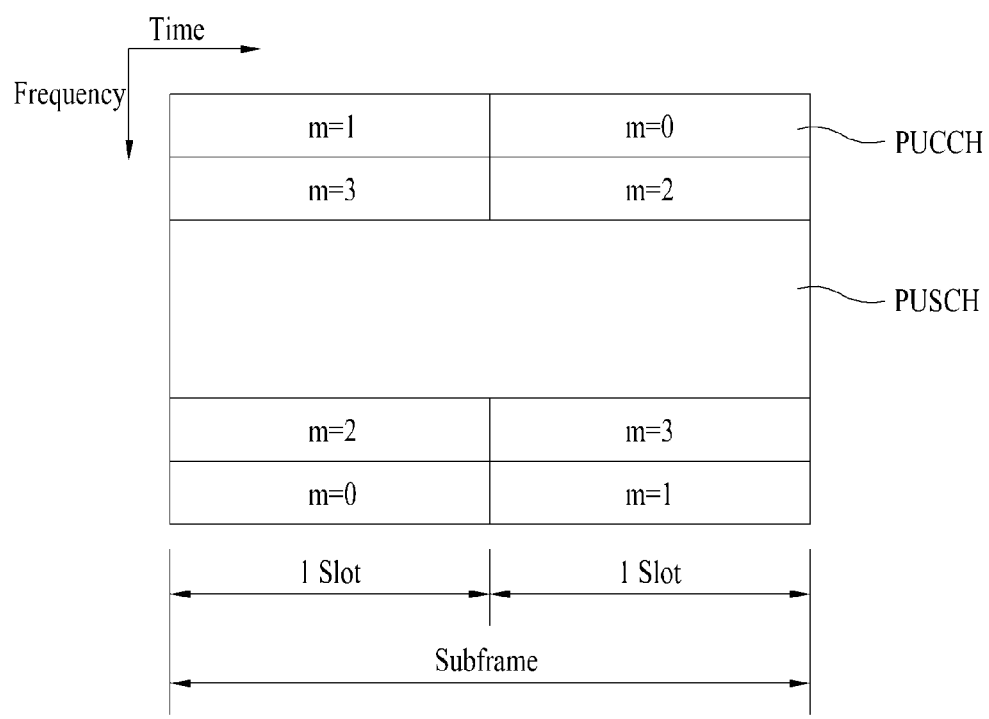
FIG. 5 illustrates an uplink subframe structure.

FIG. 5 illustrates an uplink subframe structure used in LTE(-A).

Referring to FIG. 5, an uplink subframe includes a plurality (e.g. 2) of slots. A slot may include different numbers of SC-FDMA symbols according to CP length. The uplink subframe is divided into a control region and a data region. The data region includes a PUSCH and is used to carry a data signal such as audio data. The control region includes a PUCCH and is used to carry uplink control information (UCI). The PUCCH includes an RB pair located at both ends of the data region in the frequency domain and is hopped in a slot boundary.

Figure 6:
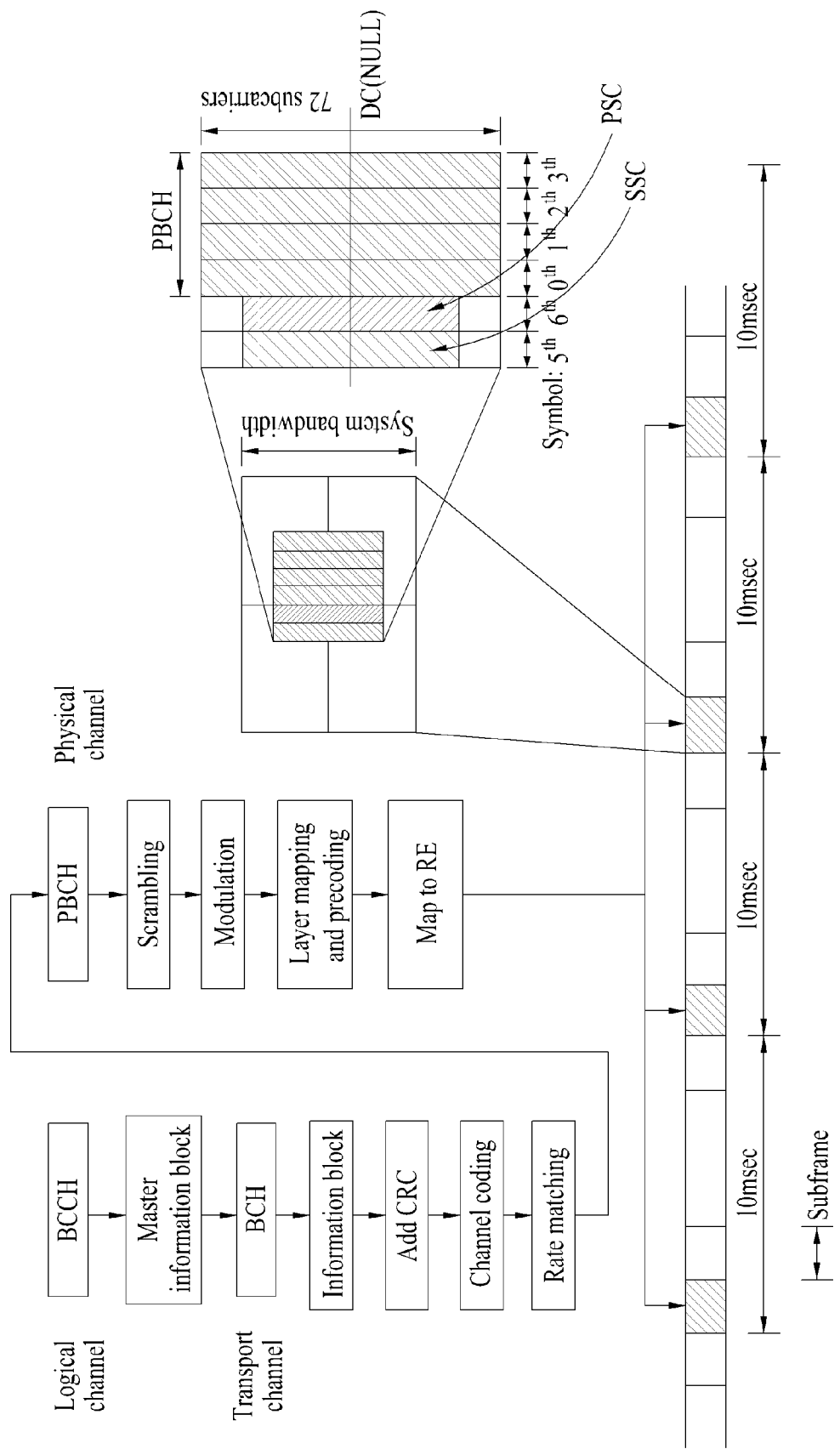

A detailed description will be given of a physical broadcast channel (PBCH) and a synchronization channel (SCH) of LTE(-A) with reference to FIGS. 6 and 7. Each SCH includes a primary SCH (P-SCH) and a secondary SCH (S-SCH). A primary synchronization signal (PSS) is transmitted on the P-SCH and a secondary synchronization signal (SSS) is transmitted on the S-SCH.

The PBCH includes a downlink bandwidth (DL BW), PHICH configuration and a system frame number (SFN). Accordingly, a UE can acquire information on the DL BW, SFN and PHICH configuration by receiving the PBCH. Referring to FIG. 6, the PBCH is subjected to cell-specific scrambling, modulation, layer mapping and precoding and then is mapped to physical resources. The PBCH is mapped to REs (k, l) indicated by Equation 1.

$$k = \frac{N_{RB}^{DL} N_{sc}^{RB}}{2} - 36 + k', \quad k' = 0, 1, \ldots, 71 \quad \text{[Equation 1]}$$

$$l = 0, 1, \ldots, 3$$

Here, l denotes the OFDM symbol index of slot #1 of subframe #0 and k denotes a subcarrier index. $N_{RB}^{DL}$ represents the number of RBs within the DL BW and $N_{sc}^{RB}$ represents the number of subcarriers included in an RB.

Equation 1 shows an example of mapping based on one radio frame. The coded PBCH is mapped to 4 subframes for 40 ms, as shown in FIG. 6. The timing of 40 ms is blind-detected and thus explicit signaling of the timing of 40 ms is not performed. As can be seen from Equation 1 and FIG. 6, the PBCH is mapped to 4 OFDM symbols and 72 subcarriers (i.e. 6 RBs) within one subframe.

Referring to FIG. 7, P-SCH is positioned in the last OFDM symbols of slot #0 and slot #10 within a radio frame in FDD mode (third OFDM symbols of subframes #1/#6 in the case of TDD). The P-SCH is transmitted using 72 subcarriers (10 subcarriers being reserved and 62 subcarriers carrying a PSS) in the corresponding OFDM symbol. The P-SCH is used to obtain time domain synchronization such as OFDM symbol synchronization, slot synchronization, etc. and/or frequency domain synchronization. S-SCH is positioned in OFDM symbols immediately prior to the last OFDM symbols of slot #0 and slot #10 within a radio frame in FDD mode (slot #1 and slot #11 in the case of TDD). The S-SCH and P-SCH are positioned in neighboring OFDM symbols. The S-SCH is transmitted using 72 subcarriers (10 subcarriers being reserved and 62 subcarriers carrying an SSS) in the corresponding OFDM symbol. The S-SCH is used to obtain frame synchronization, cell group ID and/or CP configuration (i.e. information on use of the normal CP or extended CP) of a cell.

FIG. 8 illustrates a downlink reference signal (RS) pattern.

Referring to FIG. 8, common RSs (CRS) R0 to R3 are used to acquire information regarding channel state and measure handover in LTE(-A). CRS is a cell-specific signal and is transmitted per subframe through the whole band. CRSs for a maximum of 4 antenna ports (i.e. antenna ports #0 to #3) may be transmitted although the number of antenna ports is not limited to 4. In LTE-A, a demodulation reference signal (DMRS) is used to demodulate a signal (e.g. PDSCH signal) of each layer during multi-antenna transmission. DMRS is a UE-specific signal. A maximum of 8 layers and DMRSs for the same may be used although the number of layers is not limited thereto. For convenience, DMRSs for layers #0 to #7 are respectively referred to as DMRSs #0 to #7.

DMRS is multiplexed to the same resource in an RB according to code division multiplexing (CDM). Specifically, a DMRS for each layer is spread using a spreading code (e.g. a Walsh code, an orthogonal code such as a DFT code, etc.) and then multiplexed to the same RE. For example, DMRSs for layers #0 and #1 can be spread using a spreading factor (SF) of 2 in each slot in the time domain and then multiplexed to the same RE. The DMRS for layer #0 can be spread using [+1 +1] and the DMRS for layer #1 can be spread using [+1 −1]. Similarly, DMRSs for layers #2 and #3 are spread using different orthogonal codes on the same RE. DMRSs for layers #4, #5, #6 and #7 are spread on REs occupied by DMRSs #0, #1, #2 and #3 using a code orthogonal to layers #0, #1, #2 and #3. A code with SF=2 is used for up to 4 layers and a code with SF=4 is used for DMRS for 5 or more layers. In LTE-A, antenna ports for DMRS correspond to {7, 8, . . . , n+6} (n being the number of layers) (e.g. R7 to R10 when n=4).

Figure 9A:
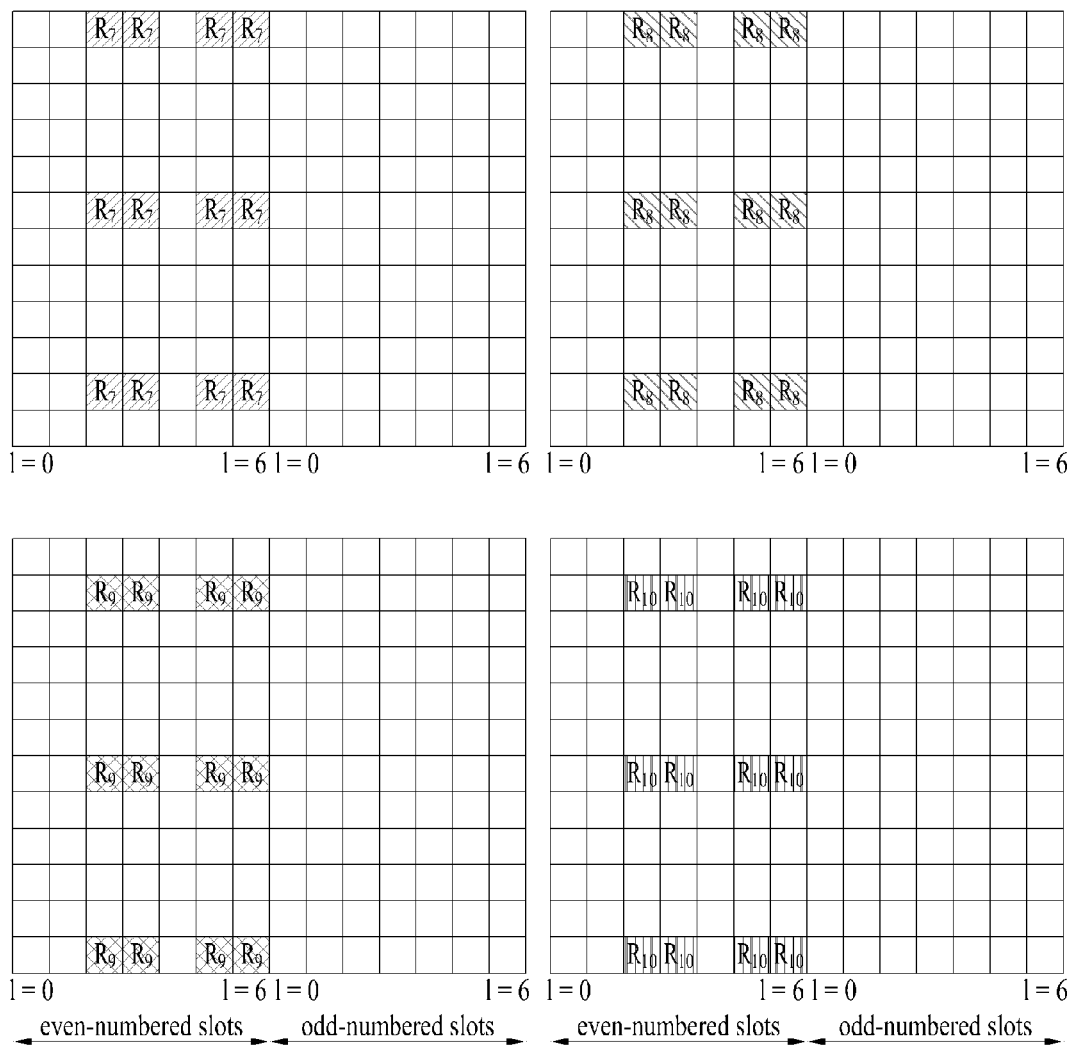
FIGS. 9 and 10 illustrate demodulation reference signal element (DMRS RE) configurations in TDD mode.
Figure 9B:
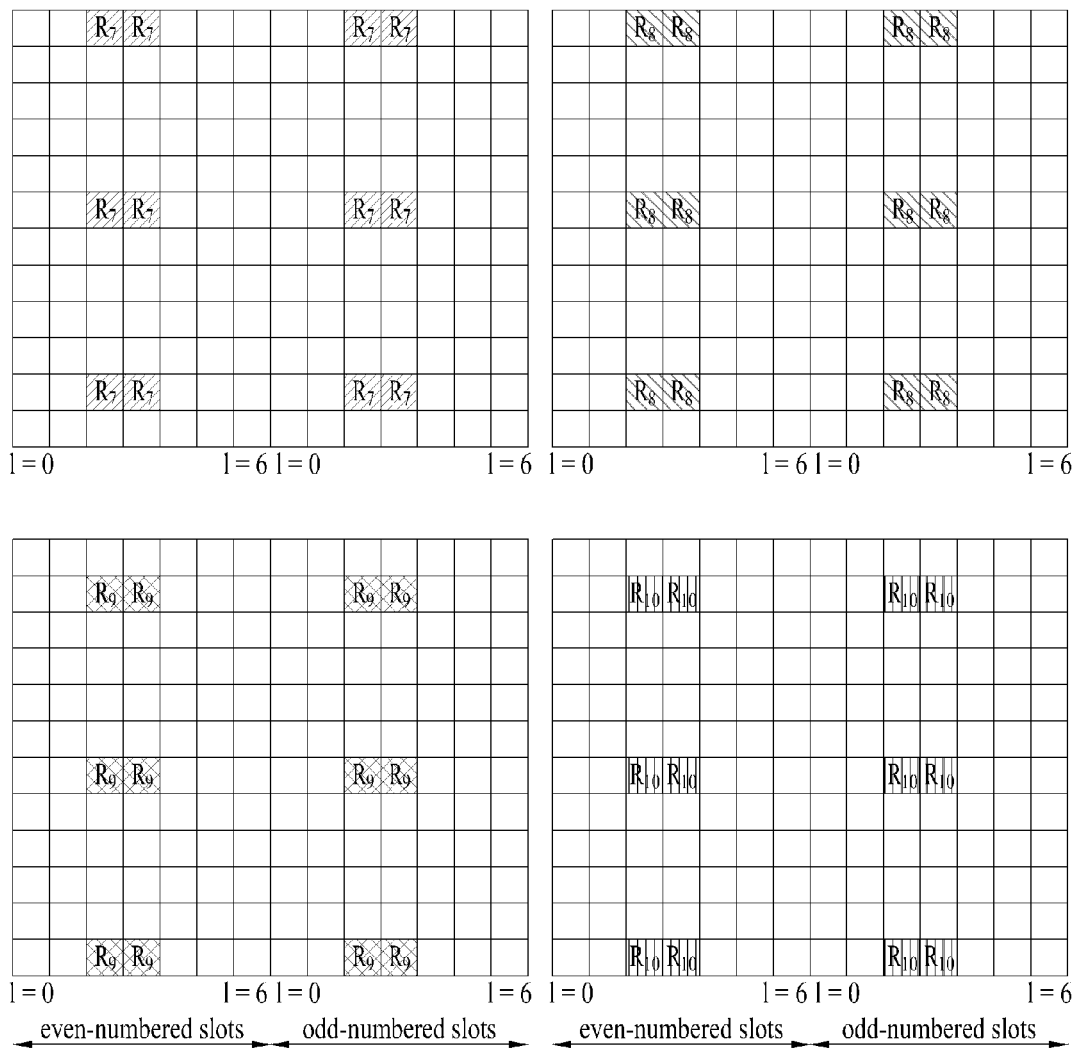
Figure 9C:
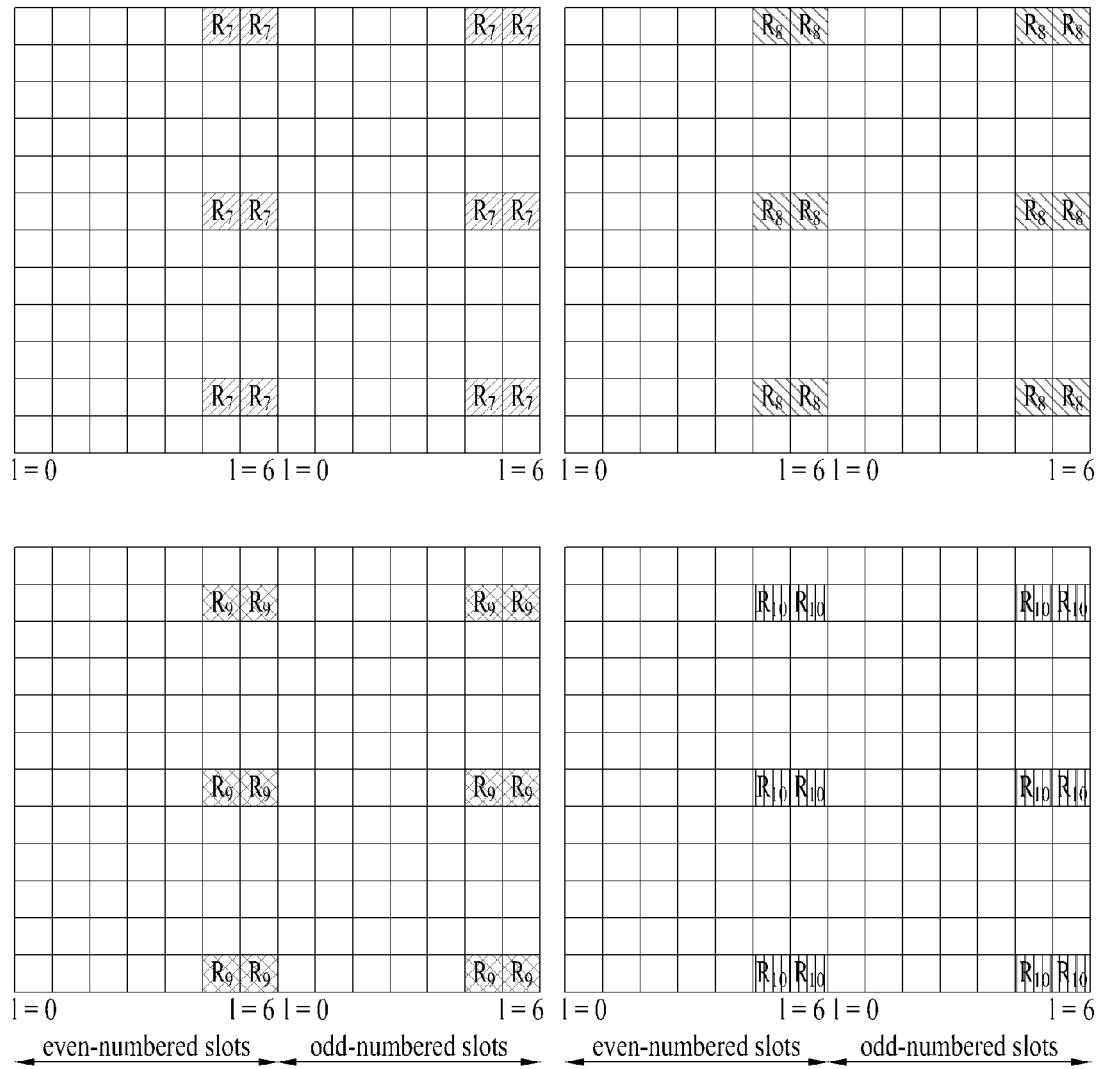

FIGS. 9*a*, 9*b* and 9*c* illustrate REs (referred to as DMRS REs hereinafter) used for a UE-specific reference signal when the normal CP is used for antenna ports #7, #8, #9 and #10 in a system operating in TDD mode. FIG. 9*a* illustrates DMRS RE configurations in the case of special subframe configurations 1, 2, 6 and 7, FIG. 9*b* illustrates DMRS RE configurations in case of special subframe configurations 3, 4 and 8 and FIG. 9c illustrates DMRS RE configurations in case of other downlink subframes.

Figure 10A:
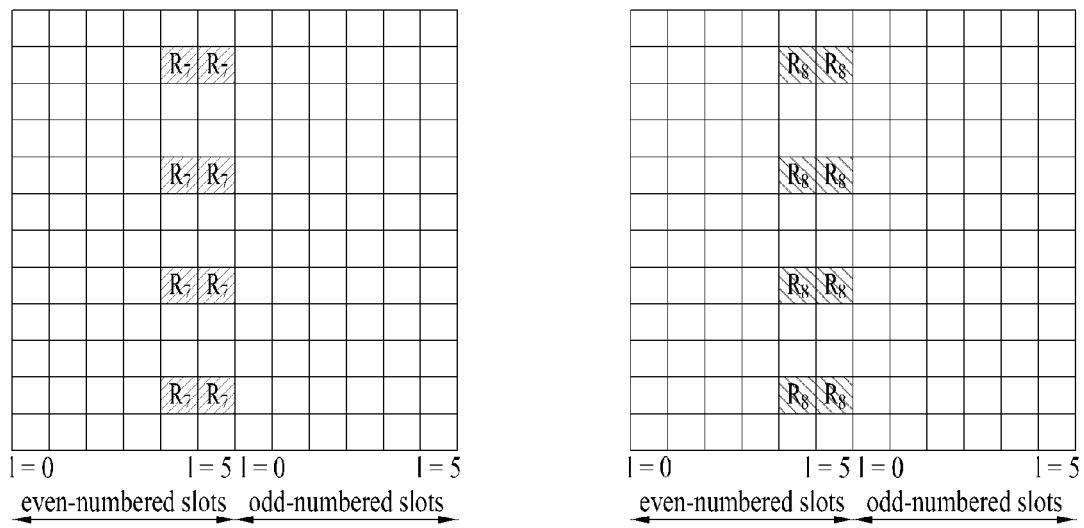
Figure 10B:
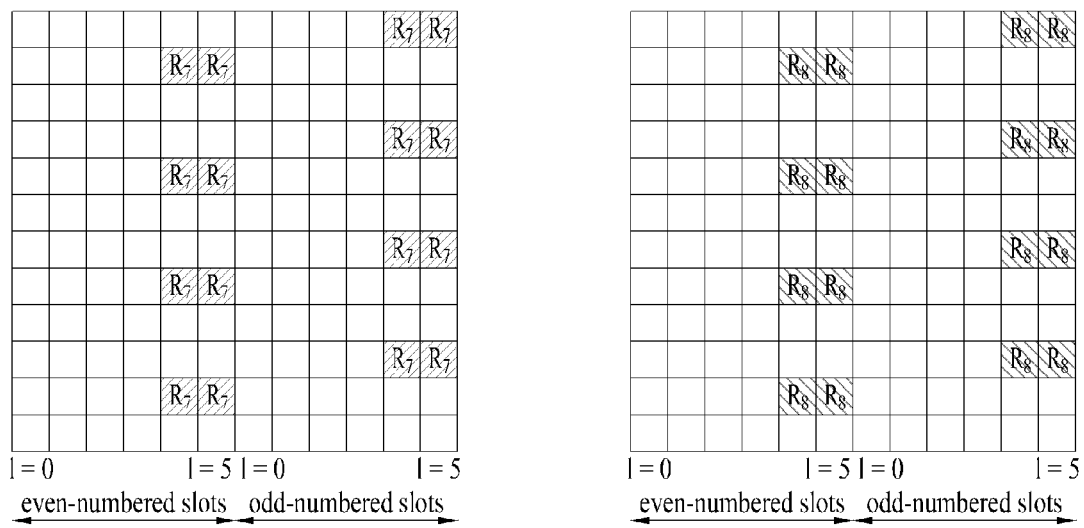

FIGS. 10a and 10b illustrate DMRS REs when the extended CP is used for antenna ports #7, #8, #9 and #10 in a system operating in TDD mode. FIG. 10a illustrates DMRS RE configurations in case of special subframe configurations 1, 2, 3, 5 and 6 and FIG. 10b illustrates DMRS RE configurations in case of other downlink subframes.

Figure 11:
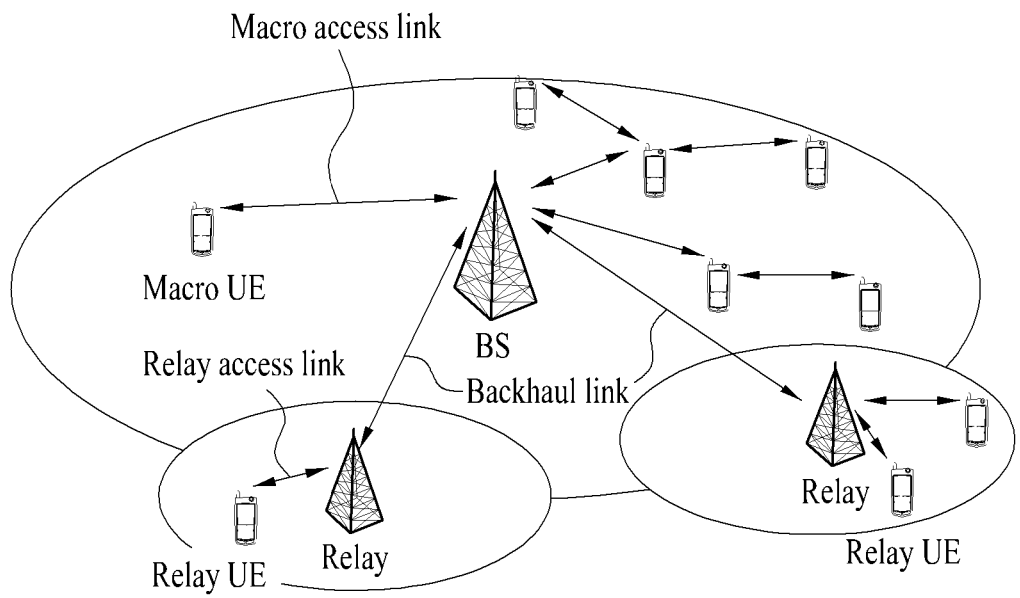
FIG. 11 illustrates a wireless communication system including relays.

FIG. 11 illustrates a wireless communication system including relays. The wireless communication system includes a BS, relays (or relay nodes (RNs)) and UEs. A UE communicates with the BS or a relay. For convenience, a UE communicating with the BS is referred to as a macro UE and a UE communicating with a relay is referred to as a relay UE. A communication link between the BS and a macro UE is referred to as a macro access link and a communication link between a relay and a relay UE is referred to as a relay access link. A communication link between the B and a relay is referred to as a backhaul link.

Figure 12:
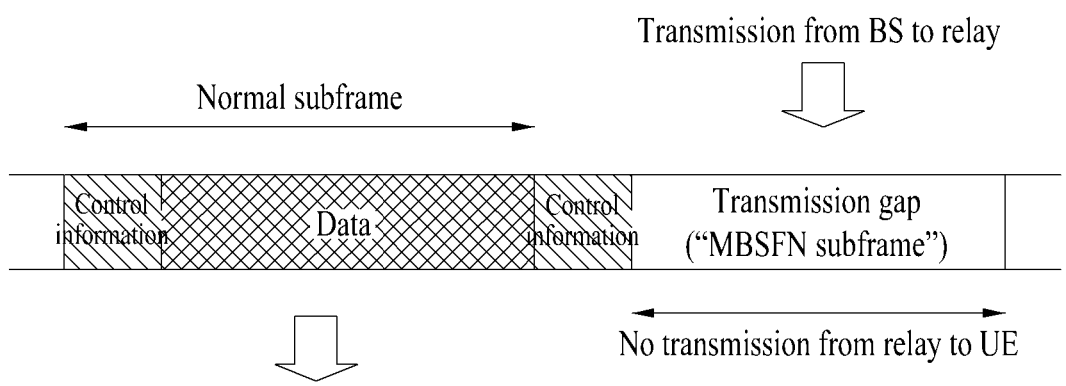
FIG. 12 illustrates backhaul transmission using a multicast broadcast single frequency network (MBSFN) subframe.

FIG. 12 illustrates backhaul transmission using an MBSFN subframe. When a relay transmits a signal to a UE while receiving a signal from a BS or transmits a signal to the BS while receiving a signal from the UE, transmission and reception may not be simultaneously performed since a transmitter and a receiver of the relay interfere with each other. Accordingly, a backhaul link and a relay access link are partitioned according to TDM. In LTE-A, a backhaul link may be configured in a subframe (referred to as an MBSFN subframe) configured for MBSFN (fake MBSFN method). Since the UE receives only a control region of the MBSFN subframe, the relay can configure the backhaul link using a data region of the MBSFM subframe. For example, the third and following OFDM symbols of the MBSFN subframe can be used for BS-relay transmission (i.e. backhaul transmission).

Figure 13:
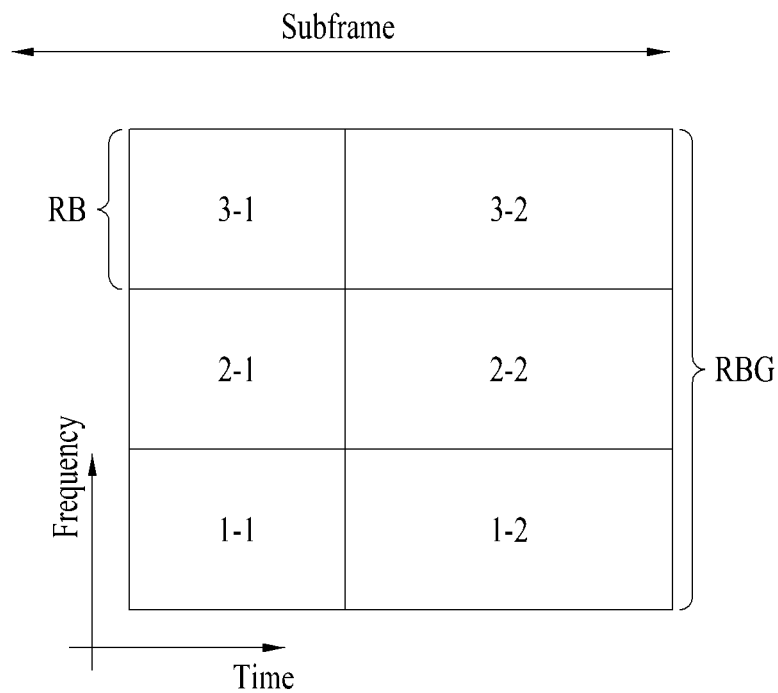
FIG. 13 illustrates an example of dividing a frequency-time resource for a relay.

FIG. 13 illustrates an example of dividing a frequency-time resource (i.e. backhaul resource) for a relay. The frequency-time resource shown in FIG. 13 may refer to part of a downlink subframe. Specifically, the frequency-time resource shown in FIG. 13 may correspond to the part of the MBSFN subframe of FIG. 12 other than the control region thereof.

In FIG. 13, frequency-time resource regions X-Y (X=1, 2 and 3; Y=1 and 2) may have various sizes. For example, X-Y can correspond to resource blocks (RBs). An RB refers to a physical resource block (PRB) or a virtual resource block (VRB). In this case, X-1 corresponds to part of an RB of the first slot, X-2 corresponds to an RB of the second slot and [X-1, X-2] corresponds to an RB pair. In the following description, RB may refer to [X-1] or [X-2] or [X-1, X-2] according to context. An RBG is composed of one or more consecutive RBs. The number of RBs constituting an RBG may depend upon system bandwidth.

Figure 14:
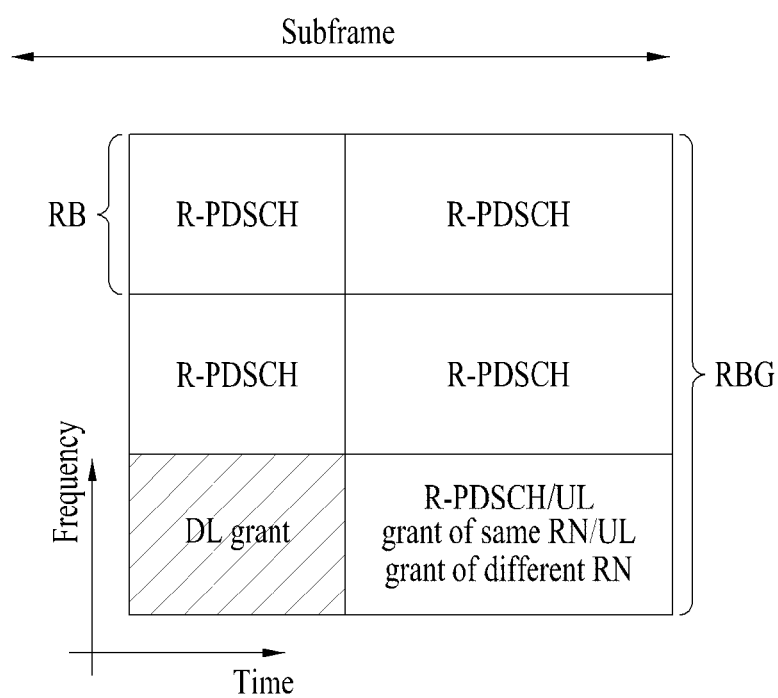
FIG. 14 illustrates allocation of a relay (R)-PDCCH/R-PDSCH.

FIG. 14 illustrates an example of allocating an R-PDCCH/(R-)PDSCH to the frequency-time resource of FIG. 13. Control information (e.g. DCI) is transmitted on the R-PDCCH and data is transmitted on the (R-)PDSCH. The R-PDCCH carries downlink scheduling information (e.g. DL grant) and/or uplink scheduling information (e.g. UL grant). A basic resource unit of the R-PDCCH includes a CCE. A CCE can be defined as one or more REGs, one or more RBs or one or more RBGs.

Referring to FIG. 14, when a DL grant of RN#1 is present in resource region 1-1 (refer to FIG. 13), (a) data ((R-)PDSCH), (b) UL grant and (c) UL grant for a different RN may be present in resource region 1-2 (refer to FIG. 13). It is possible to recognize which one of (a), (b) and (c) is present in resource region 1-2 using resource allocation (RA) information (e.g. RBG or RB allocation information) of the DL grant.

Similarly to a relay system, PDCCH transmission using a data region (e.g. PDSCH region) of a subframe between a BS and a UE or between a relay and a UE is under discussion. This is because the quantity of PDCCHs that need to be transmitted by a specific cell (e.g. scheduling cell) increases due to cross-carrier scheduling, for example.

Figure 15:
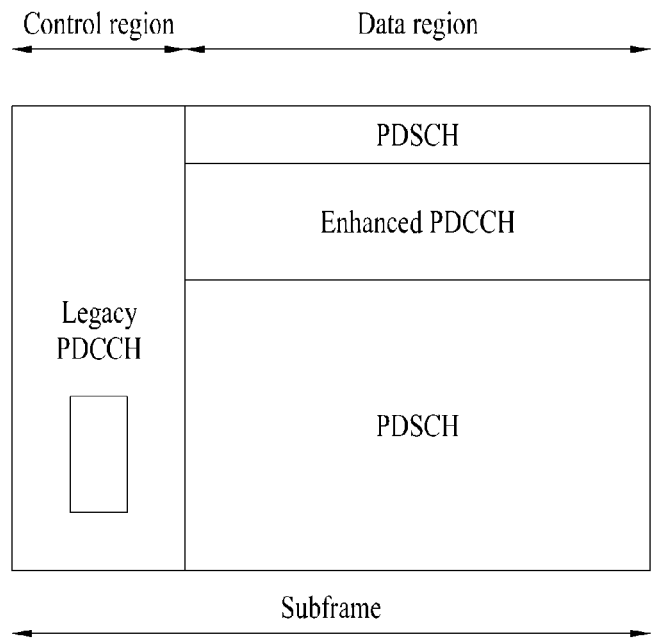
FIG. 15 illustrates allocation of a PDCCH to a data region (e.g. PDSCH region) of a subframe.

FIG. 15 illustrates an example of allocating a PDCCH to a data region (e.g. PDSCH region) of a subframe. Referring to FIG. 15, a PDCCH (legacy PDCCH) according to LTE can be allocated to a control region of the subframe. A PDCCH may be additionally allocated using some resources of the data region. For convenience, the PDCCH allocated to the data region is referred to as an enhanced PDCCH (E-PDCCH) (or advanced PDCCH (A-PDCCH). While FIG. 15 illustrates a case in which the E-PDCCH is present in the entire data region (i.e. 2 slots), this is exemplary and the E-PDCCH may be present on a slot basis. That is, an E-PDCCH for a DL grant can be transmitted in the first slot and an E-PDCCH for a UL grant can be transmitted in the second slot, as illustrated in FIG. 14.

A description will be given of a method for allocating and operating a resource for a downlink control channel using a data region (e.g. PDSCH) of a subframe. While the following description is based on a relay system, the method can be equally/similarly applied to a BS-UE system or a relay-UE system, as described above with reference to FIG. 15. Accordingly, the BS-relay can be replaced by a BS-UE or a relay-UE in the following description. A relay and a UE may be normalized as a receiver in terms of signal reception and a BS and a relay may be normalized as a transmitter in terms of signal transmission. In the following description, an R-PDCCH can be replaced by an E-PDCCH illustrated in FIG. 15. R-PDCCH and E-PDCCH differ from legacy PDCCH and may be commonly referred to as X-PDCCH (simply, PDCCH).

R-PDCCH and PDSCH will now be described in more detail. R-PDCCH carries DCI for a relay. DCI has been described with reference to FIG. 4. For example, the R-PDCCH can carry downlink scheduling information and uplink scheduling information for the relay. Downlink data (e.g. backhaul data) for the relay is received through a PDSCH. A communication procedure using the R-PDCCH/PDSCH is identical/similar to step S107 illustrated in FIG. 1. That is, the relay receives the R-PDCCH and receives data/control information through the PDSCH indicated by the R-PDCCH. An R-PDCCH transmission process (e.g. channel coding, interleaving, multiplexing, etc.) can be performed using processing defined in LTE as long as possible and may be modified as necessary.

The relay performs PDSCH decoding/demodulation on the basis of the control information obtained from the R-PDCCH. Accordingly, it is very important to correctly acquire R-PDCCH information. In LTE, a PDCCH candidate region (PDCCH search space) is reserved in a control region and a PDCCH of a specific UE is transmitted in a part of the PDCCH candidate region. Accordingly, the UE can obtain the PDCCH thereof from the PDCCH search space through blind decoding. In a similar manner, the relay can employ a method of transmitting the R-PDCCH through part or all of a previously reserved resource.

Figure 16:
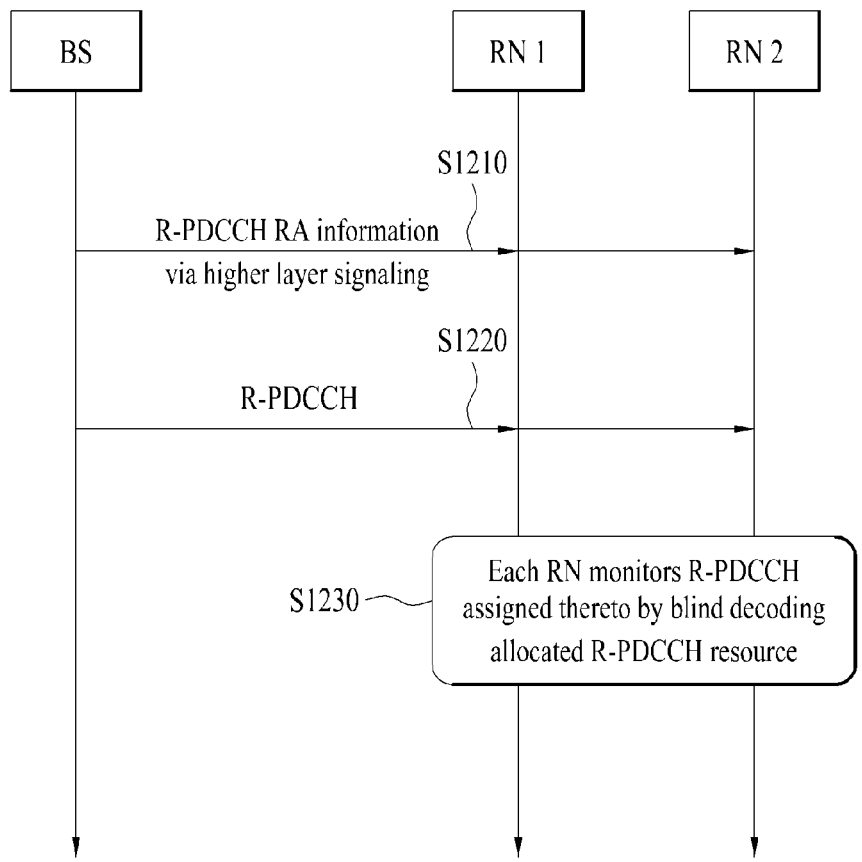
FIG. 16 illustrates a process of allocating a resource for an R-PDCCH and receiving a PDCCH.

FIG. 16 illustrates a process of allocating a resource for an R-PDCCH and receiving the R-PDCCH.

Referring to FIG. 16, a BS transmits R-PDCCH resource allocation (RA) information to a relay (S1210). The R-PD- CCH RA information may include RB (or VRB) allocation information. The RB allocation information may be provided on an RB or RBG basis. The R-PDCCH RA information may be transmitted using higher layer (e.g. radio resource control (RRC)) signaling. Here, R-PDCCH RA information is used to reserve a resource (region) for an R-PDCCH. The BS transmits the R-PDCCH in a backhaul subframe (S1220). The R-PDCCH can be transmitted in part or all of the R-PDCCH resource region (e.g. M RBs) reserved in step S1210. Accordingly, the relay monitors the resource (region) (referred to as an R-PDCCH search space (SS) or simply search space) in which the R-PDCCH can be transmitted (S1230). Specifically, the relay blind-decodes a plurality of R-PDCCH candidates within the search space. Upon detection of the R-PDCCH allocated to the relay, the relay performs operations (e.g. PDSCH reception, PUSCH transmission, Tx power control, etc.) according to the R-PDCCH (not shown) (refer to S107 and S108 of FIG. 1).

Figure 17:
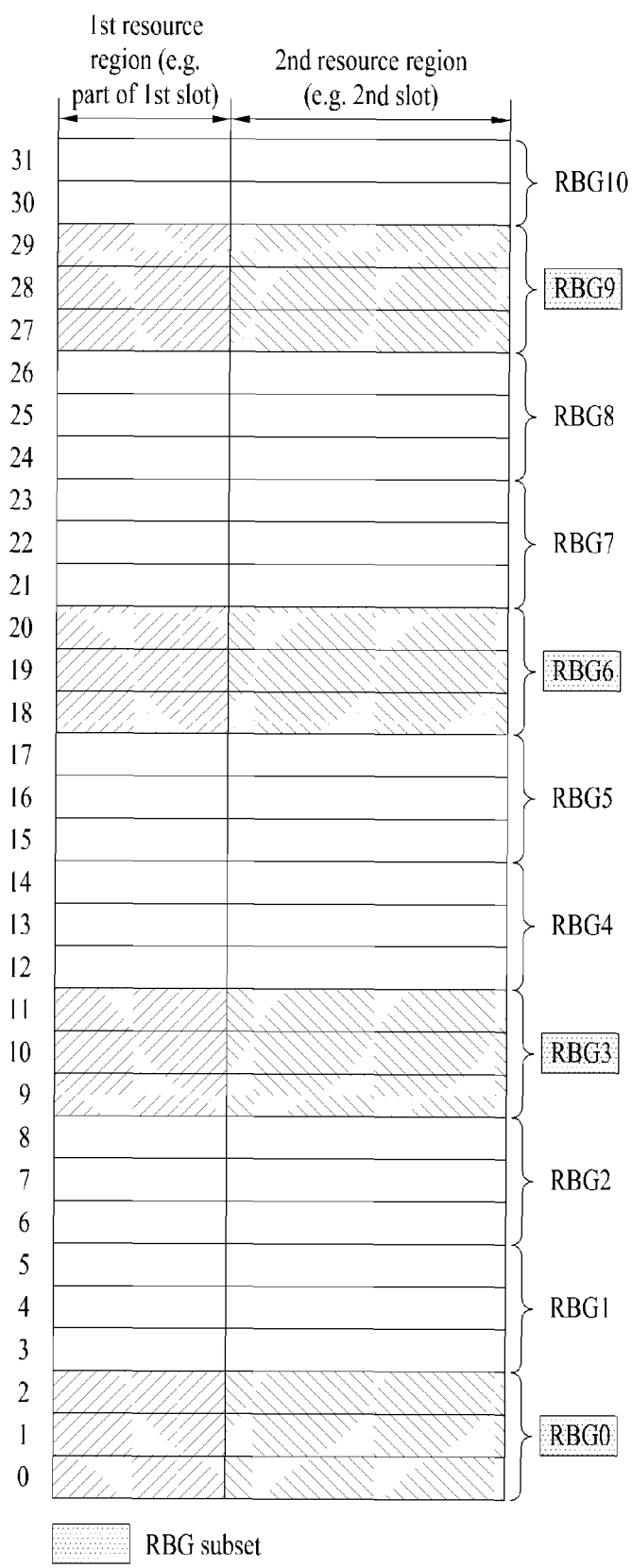
FIG. 17 illustrates an example of configuring a search space in a data region of a subframe.

FIG. 17 illustrates an example of configuring a search space (SS) in a data region of a subframe. FIG. 17 shows a case in which the R-PDCCH RA information of FIG. 16 includes RBG allocation information. Referring to FIG. 17, RBGs 3, 6 and 9 are set to SSs and a relay performs blind decoding in RBGs 3, 6 and 9 in order to receive an R-PDCCH allocated thereto. While FIG. 17 illustrates a case in which the SSs use the same resource (e.g. RB, RBG) on a subframe basis, an SS may be independently defined per slot.

A description will be given of the structure of a special subframe applied to a TDD radio frame and a problem when DCI is transmitted in the special subframe.

Table 3 shows special subframe configurations (simply, configurations) and DwPTS/GP/UpPTS durations according thereto.

transmission. In this case, the number of OFDM symbols of the first slot, which can be used for DwPTS, may be limited to 1 in the case of configurations 0 and 5 and to 5 in the case of configurations 1, 2, 3, 4, 6, 7 and 8. Accordingly, while configurations 1, 2, 3, 4, 6, 7 and 8 can be used for backhaul transmission (e.g. DL grant), it may be difficult to use configurations 0 and 5 for backhaul transmission (e.g. DL grant). However, since the numbers of OFDM symbols of the second slot, which are used for DwPTS, are 2, 3 and 4 in the case of configurations 1, 2, 3, 6, 7 and 8, configurations 1, 2, 3, 6, 7 and 8 may be inappropriate for UL grant transmission in the second slot. Accordingly, allocation of a larger number of RBs may be considered for UL grant transmission. However, this method is not desirable because RB resources may not be efficiently used.

To solve the above-described problem, a method for configuring a resource (e.g. SS) for an X-PDCCH (e.g. R-PDCCH and E-PDCCH) will now be described with reference to the attached drawings. While the following description is based on transmission of an X-PDCCH (e.g. R-PDCCH and E-PDCCH) in a system operating in TDD mode, some suggestions of the present invention are also applicable to FDD mode and/or a normal downlink subframe. In this case, related explanations and illustrations are described in corresponding parts. In addition, the following description focuses on operations of a UE/relay/BS in a special subframe and operations of other subframes may be performed based on FIGS. 13 to 17.

Furthermore, while the following description is based on the assumption that an MBSFN subframe is used for backhaul transmission, an additional subframe (e.g. backhaul dedicated subframe) may be defined for backhaul transmission. In addition, while the following description focuses on backhaul transmission (e.g. R-PDCCH), the present inven-

TABLE 3

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 18:
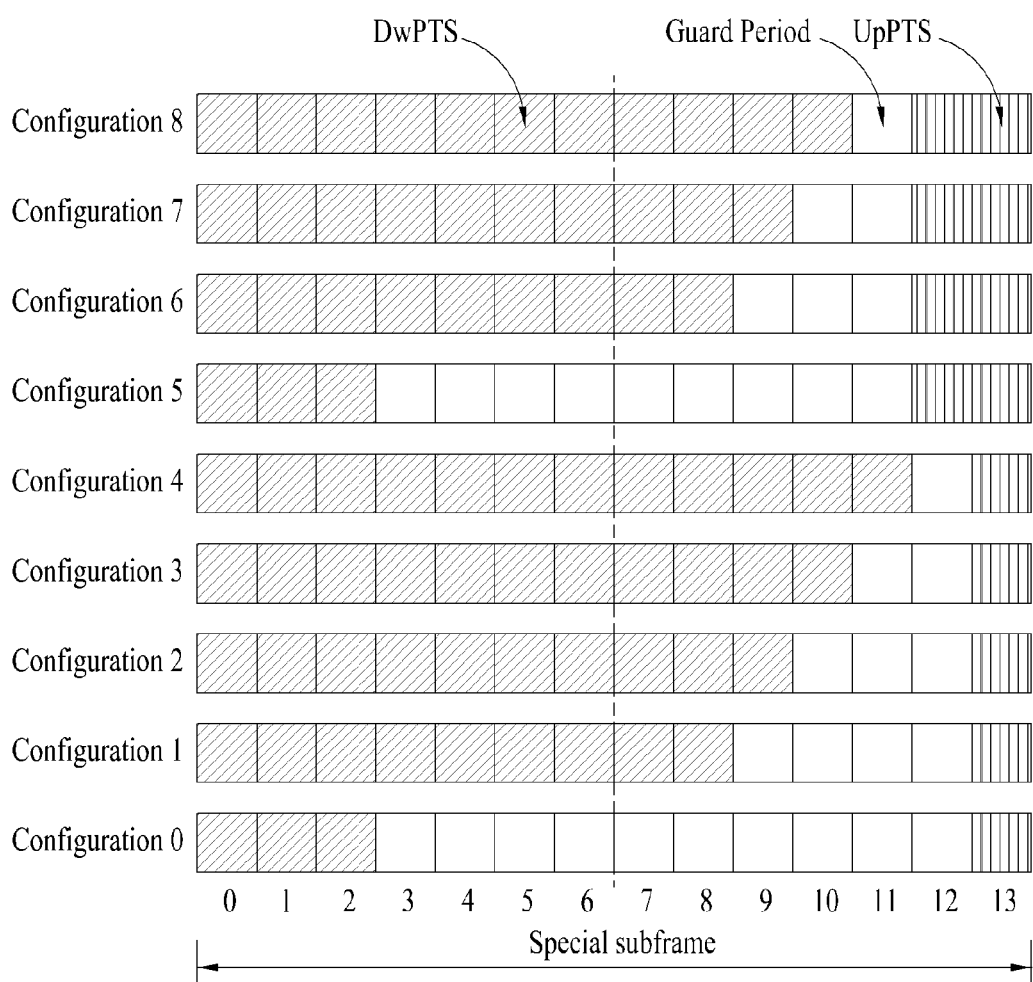
FIG. 18 illustrates a special subframe structure.

FIG. 18 illustrates the numbers of OFDM symbols of DwPTS, GP and UpPTS according to the configurations of Table 3. For convenience, FIG. 18 illustrates a case in which the normal CP is used (i.e. 14 OFDM symbols are used). In addition, it is assumed that a DL grant is transmitted in the first subframe and a UL grant is transmitted in the second subframe.

Referring to FIG. 18, the number of OFDM symbols that can be used for backhaul transmission (i.e. DwPTS) depends upon the configuration. Specifically, configurations 0 and 5 can use the first 3 OFDM symbols of the first slot for DwPTS. Configurations 1, 2, 3, 4, 6, 7 and 8 can use all OFDM symbols of the first slot for DwPTS. When an MBSFN subframe is used as a backhaul subframe, first N (e.g. N=2) OFDM symbols are not used for backhaul tion may be equally/similarly applied to access transmission (e.g. E-PDCCH). In this case, an access subframe may have the structure of FIG. 15. Further, the following description assumes a normal CP case (i.e. 7 OFDM symbols per slot), the present invention can be equally applied to an extended CP case (i.e. 6 OFDM symbols per slot). Moreover, while embodiments are independently described in the following, the embodiments may be combined in an arbitrary manner.

Embodiment 1: Configuration of a DL/UL Common Search Space

According to the present embodiment, a UL grant as well as a DL grant can be transmitted in the first slot. To achieve this, a DL/UL common search space can be configured in the same resource at all times or according to predetermined conditions. Here, a DL search space refers to a resource region in which a DL grant R-PDCCH candidate is transmitted and a UL search space refers to a resource region in which a UL grant R-PDCCH candidate is transmitted. The DL/UL common search space refers to a resource region in which both the DL grant R-PDCCH candidate and the UL grant R-PDCCH candidate can be transmitted.

Figure 19:
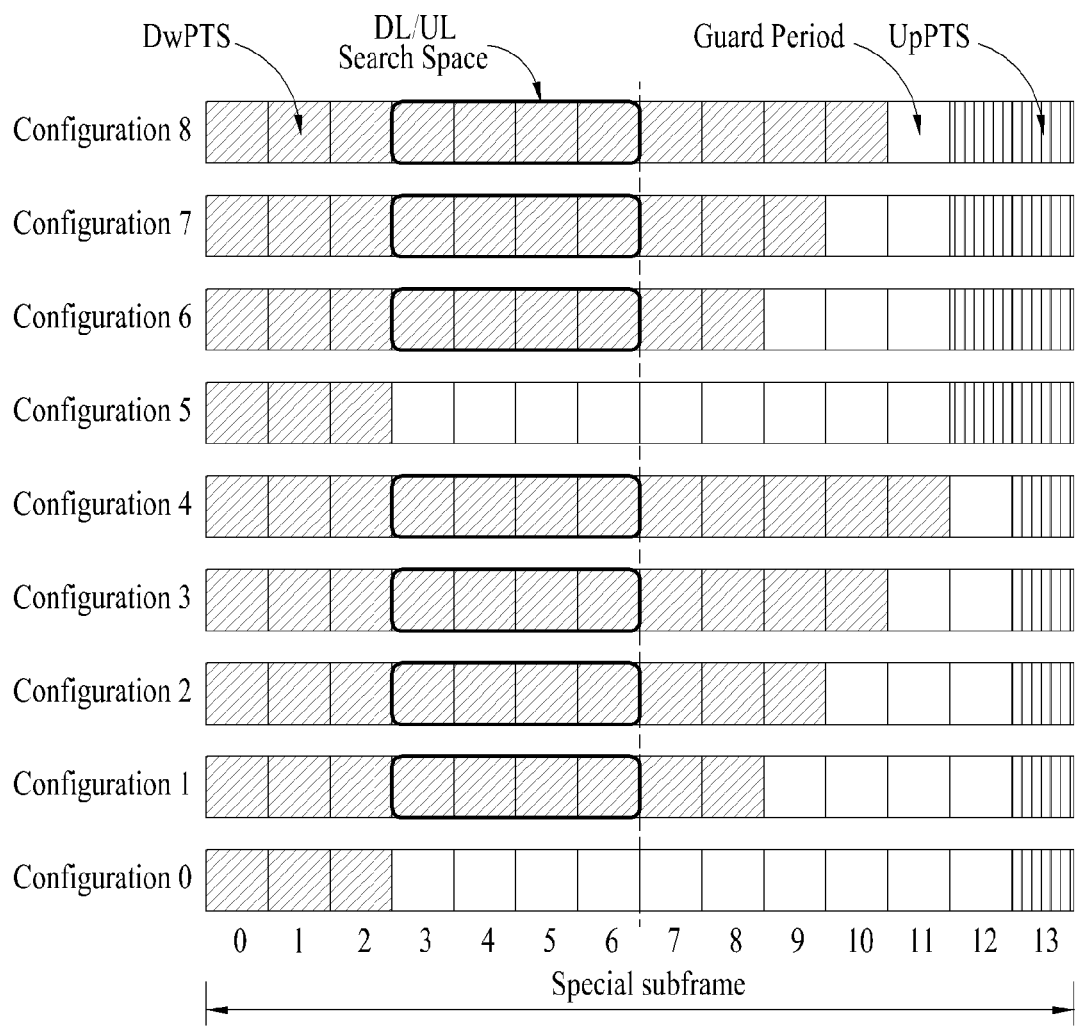
FIGS. 19, 20 and 21 illustrate methods for configuring a search space in a special subframe according to embodiments of the present invention.
Figure 20:
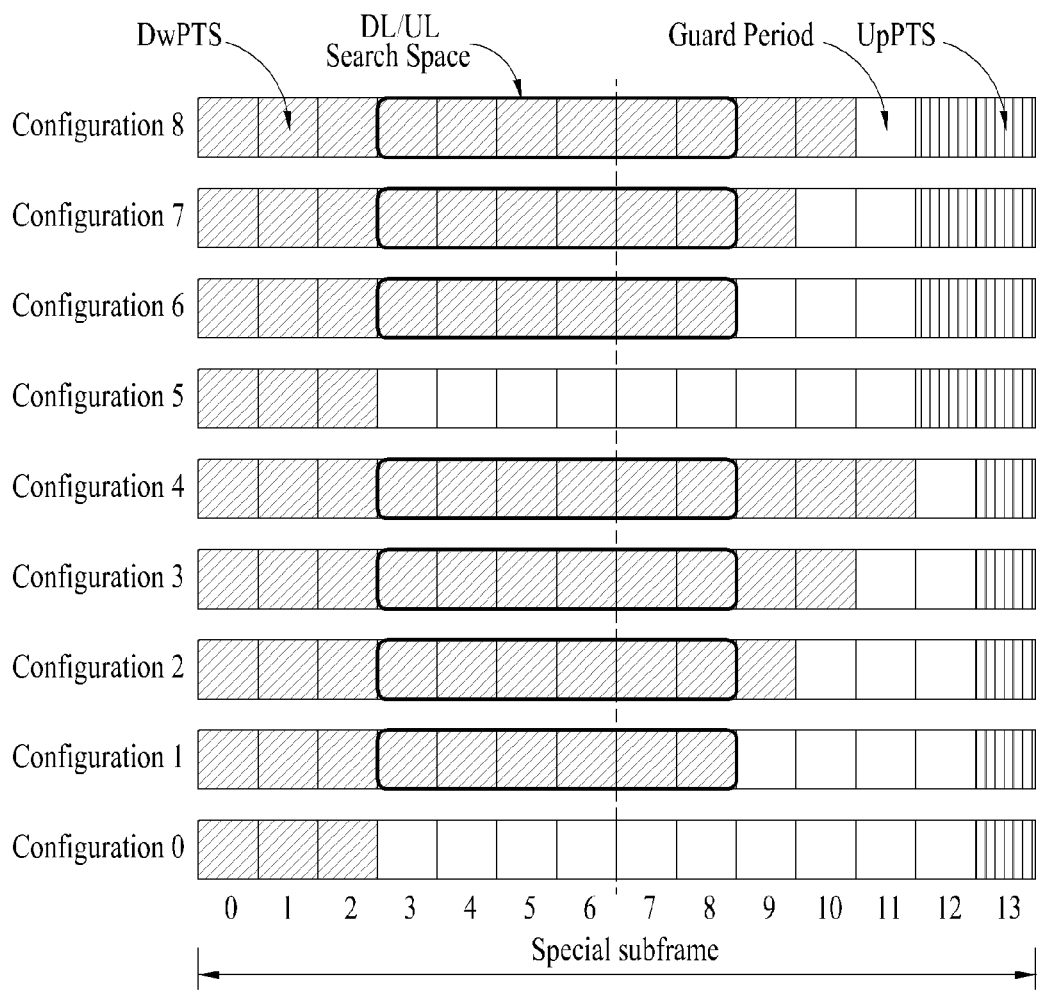
Figure 21:
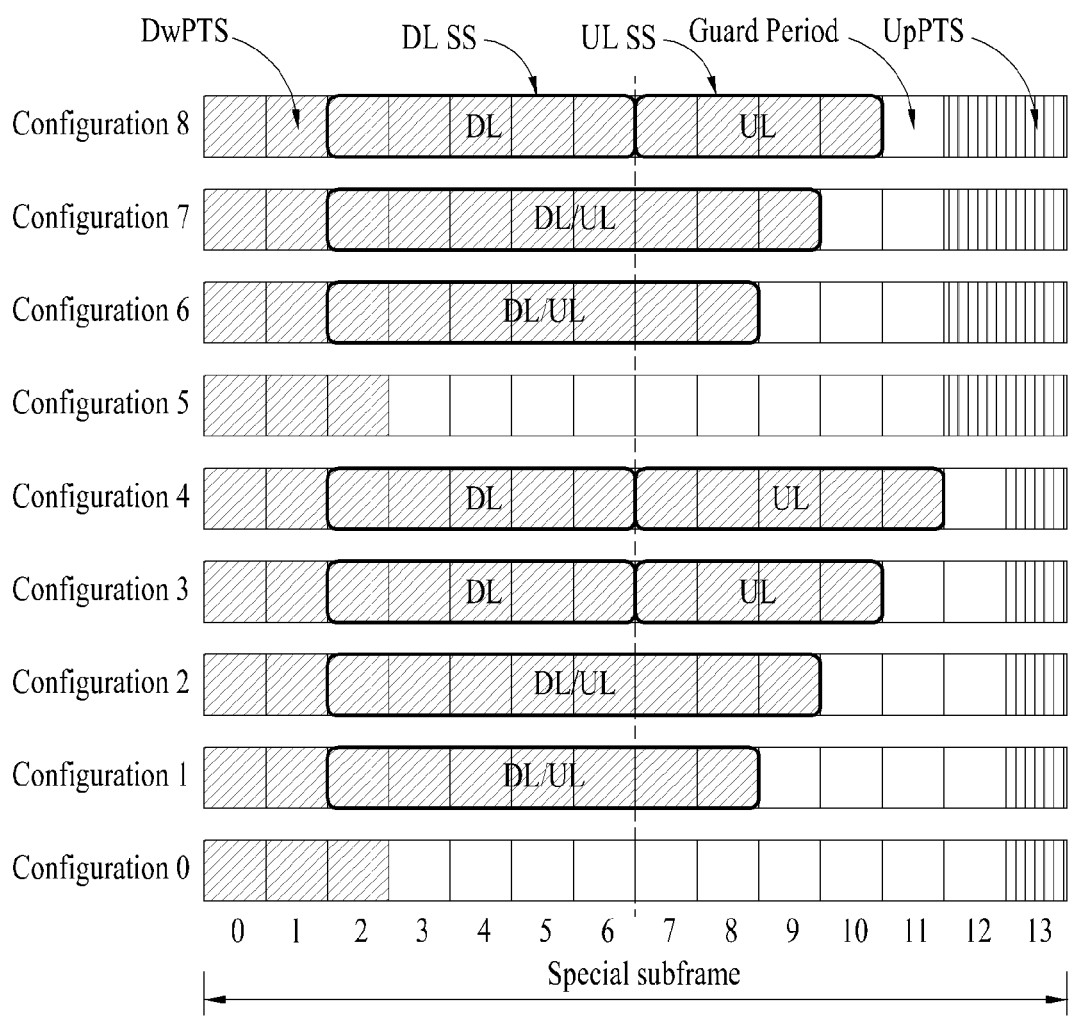

FIGS. 19, 20 and 21 illustrate methods for configuring a search space in a special subframe according to the present embodiment. Referring to FIG. 19, only the first slot of the special subframe can be used for R-PDCCH transmission and the second slot thereof is not transmitted for R-PDCCH transmission. Specifically, OFDM symbols #M to #6 of the first slot can be used as the DL/UL common search space for the R-PDCCH. Here, M is an integer equal to or greater than 1. M may have a value depending on the type/characteristics/purpose/configuration (e.g. whether or not an MBSFN subframe is configured, CRS configuration (e.g. 2Tx or 4Tx), etc.) of the special subframe. As illustrated, configurations #0 and #5 cannot be used for R-PDCCH transmission when M=3. According to the present embodiment, in configurations #1, #2, #3, #4, #6, #7 and #8, a resource region for the R-PDCCH is maintained and a conventional DL grant R-PDCCH search process (i.e. monitoring a search space in the first slot only) can be used.

Referring to FIG. 20, the first slot to the second OFDM symbol of the second slot of the special subframe can be used for R-PDCCH transmission. Specifically, OFDM symbols #M to #8 can be used as the DL/UL common search space for the R-PDCCH. Here, M is an integer equal to or greater than 1. M may have a value depending on the purpose/configuration (e.g. whether or not an MBSFN subframe is configured, CRS configuration (e.g. 2Tx or 4Tx), etc.) of the special subframe. As illustrated, configurations #0 and #5 cannot be used for R-PDCCH transmission when M=3. According to the present embodiment, available DwPTS resources can be used as much as possible while maintaining a resource region for the R-PDCCH in configurations #1, #2, #3, #4, #6, #7 and #8.

FIG. 21 illustrates a case in which a search space is started from the third OFDM symbol (i.e. symbol #2) of the first slot in consideration of DMRS RE position. Referring to FIG. 21, the DL/UL common search space can be configured according to a predetermined condition. For example, when DMRS REs are disposed in the first slot and the second slot (i.e. configurations #3, #4 and #8), the DL search space and UL search space can be respectively configured in the first slot and the second slot (i.e. the search spaces are separated by the slots). When DMRS REs are located in the first slot only (i.e. configurations #1, #2, #6 and #7), a search space including DMRS REs can be configured in the first slot only and used as the DL/UL common search space. Referring to FIG. 21, whether or not the DL/UL common search space is configured is determined depending on the number of DwPTS OFDM symbols (or the configuration) present in the second slot. For example, search spaces are separated by the slots when the number of DwPTS OFDM symbols in the second slot is greater than a specific value (e.g. 4). On the other hand, when the number of DwPTS OFDM symbols in the second slot is less than a specific value (e.g. 4), the DL/UL common search space can be configured throughout the two slots (i.e. subframe).

Embodiment 2: Configuration of Starting and Encoding OFDM Symbols

An R-PDCCH search space and an E-PDCCH search space may have different DL grant positions, UL grant positions and starting OFDM symbol positions. For example, the fourth OFDM symbol (symbol #3) of the first slot corresponds to the starting OFDM symbol in the R-PDCCH search space (refer to FIGS. 19 and 20), whereas the second OFDM symbol (symbol #1) or the third OFDM symbol (symbol #2) of the first slot corresponds to the starting OFDM symbol in the E-PDCCH search space. For configuration of the R-PDCCH search space and E-PDCCH search space, a resource size for RN PDCCH transmission can be limited to a single OFDM symbol. This can be achieved by limiting the number of Tx antennas of the relay to 2. That is, the number of OFDM symbols used for RN PDCCH transmission can be controlled by limiting the number of antennas used for signal transmission. Here, the RN PDCCH refers to a PDCCH transmitted by the relay to a UE. The ending OFDM symbol of a search space can be previously fixed as illustrated in FIGS. 19 and 20. For example, the ending OFDM symbol of a search space can be set to the ending OFDM symbol of the first slot or to the second OFDM symbol of the second slot. For this, the starting and ending OFDM symbols of a search space can be previously appointed between a transmitter and a receiver or semi-statically predetermined through a higher layer signal (e.g. RRC signal). Alternatively, the starting and ending OFDM symbols of a search space may be determined depending upon a special subframe configuration. For example, when a special subframe configuration index is given, the starting and ending OFDM symbols of a search space can be recognized. That is, starting and ending OFDM symbol positions can be set for each special subframe configuration according to characteristics of the corresponding configuration. While the above description is based on the R-PDCCH, the above-mentioned methods can be equally applied to determination of the starting and ending OFDM symbols of the E-PDCCH search space.

Embodiment 3: Configuration of Search Space According to Subframe Characteristics In the case of a DL-to-DL switch-point period of 5 ms (TDD UL-DL configurations #0, #1, #2 and #6), subframe #1 and subframe #6 in a radio frame are used as special subframes. However, since a synchronization signal is transmitted in subframe #1, a search space needs to be configured in consideration of the synchronization signal. To achieve this, DwPTS can be limited to 3 OFDM symbols in a corresponding special subframe at all times. Accordingly, when a guard period (GP) is assigned to a single OFDM symbol in the corresponding special subframe, UpPTS is allocated to 10 OFDM symbols. This specially limited subframe structure can be applied to a special subframe, in which the synchronization signal is transmitted, only or to all special subframes.

When the third OFDM symbol in which a PSS is present is included in a search space, an R-PDCCH must not be mapped to 6 RBs through which the PSS is transmitted. To achieve this, DCI may be rate-matched and then mapped to physical resources in consideration of the 6 RBs through which the PSS is transmitted or mapped to the physical resources and then punctured in consideration of the 6 RBs through which the PSS is transmitted. In this case, the relay can attempt to decode the R-PDCCH on the assumption that the R-PDCCH has been rate-matched or punctured in the 6 RBs in which the PSS is transmitted. However, puncturing or rate matching may deteriorate performance due to characteristics of control information (i.e. DCI). Accordingly, a method of configuring an SS set such that resources (e.g. an SS) for R-PDCCH transmission do not include a PSS can be considered as an alternative. In this case, an R-PDCCH SS for a special subframe and an R-PDCCH SS for a normal subframe can be configured such that an R-PDCCH SS configuration for a special subframe and an R-PDCCH SS configuration for a normal subframe are identical to each other at all times, considering that an R-PDCCH SS is configured according to an RRC signal. Alternatively, the R-PDCCH SS for a special subframe and the R-PDCCH SS for a normal subframe may be respectively set and signaled and an SS set that meets predetermined conditions may be used (S1210 of FIG. 16). For example, SS set #1 can be configured in a special subframe in which the PSS is transmitted and SS set #2 can be used in other subframes. Here, SS set #1 can be configured such that the 6RBs through which the PSS is transmitted are not included in SS set #1 and SS set #2 can be configured freely. Alternatively, SS set #1 can be configured for all special subframes and SS set #2 can be configured for other subframes. The concept of this scheme can be extended to a method of individually configuring SS sets according to subframe characteristics. Here, individual SS sets are assumed to be provided according to a higher layer signal (e.g. RRC signal). Furthermore, a method of detecting an SS on the basis of UE-specific ID, like the method of detecting an SS of a legacy PDCCH defined in LTE, is applicable.

While the above description corresponds to a case in which an R-PDCCH SS is allocated to a special subframe, the present embodiment can be extended to a case in which an SS is allocated to a specific subframe in which a specific control channel signal (e.g. P-SCH, S-SCH, P-BCH or the like) is transmitted. In this case, the present embodiment can be applied to both TDD mode and FDD mode operations. Specifically, when an X-PDCCH is allocated to the specific subframe, the X-PDCCH (DCI) can be rate-matched or punctured such that such X-PDCCH is not mapped to a frequency resource (e.g. PRBs) through which a specific control channel signal is transmitted or a time-frequency resource (e.g. PRBs*Q OFDM symbols). Otherwise, a plurality of SS sets may be preconfigured according to a higher layer signal (e.g. RRC signal) (S1210 of FIG. 16) and a corresponding SS set may be selectively used according to subframe characteristics/type. For example, SS set #1 can be configured in the above-mentioned specific subframe and SS set #2 can be used in other subframes. Here, SS set #1 can be configured such that a frequency region through which a specific control channel signal is transmitted is not included in the same and SS set #2 can be configured freely.

Embodiment 4: DMRS RE Puncturing or CRS-Based R-PDCCH

Figure 22:
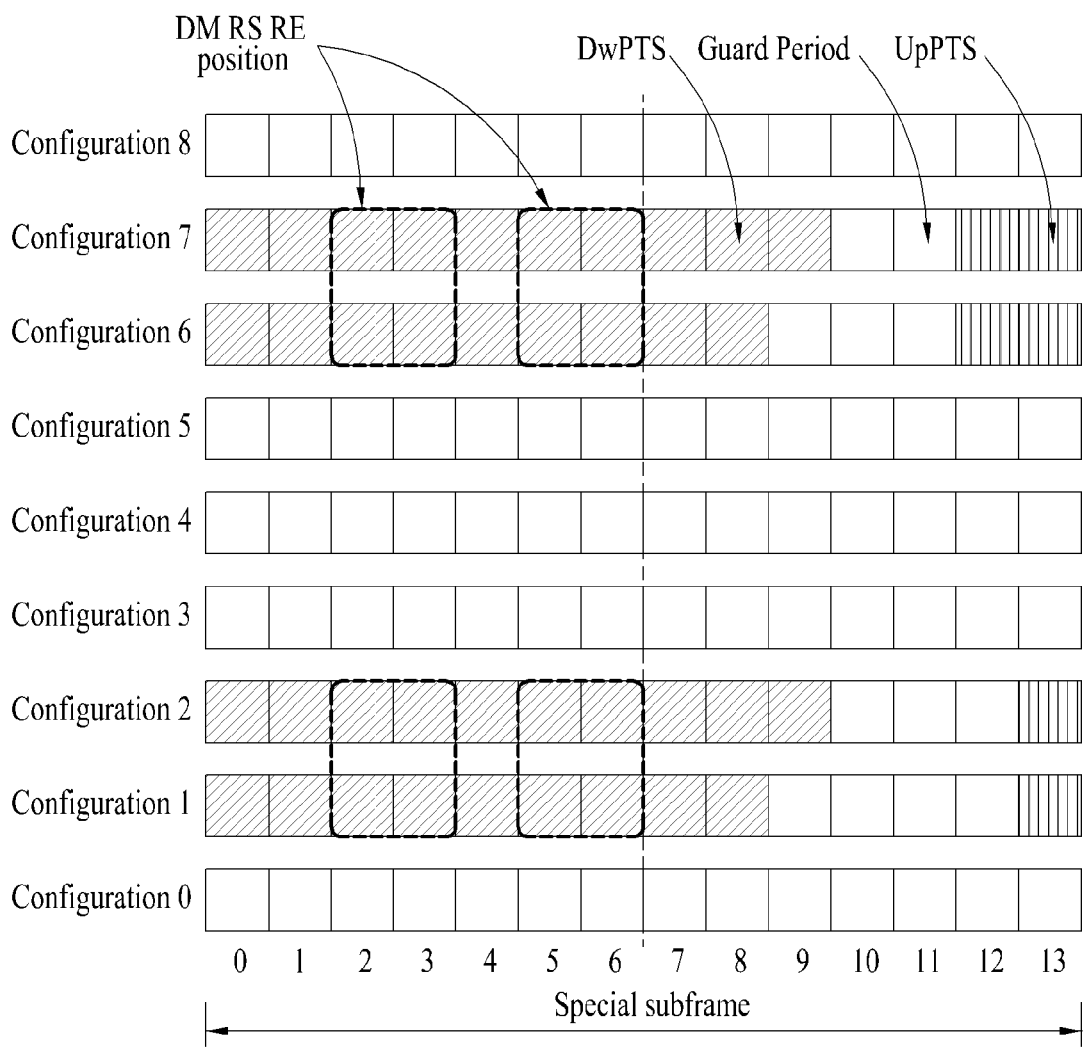
FIGS. 22 and 23 illustrate DMRS groups according to special subframe configurations.

If the relay uses 4 Tx antennas when a special subframe is used as a backhaul subframe, the relay uses at least the first 2 OFDM symbols (i.e. OFDM symbols #0 and #1) of the first slot in order to transmit a CRS to a UE. Accordingly, when a time required for transmission/reception switching is considered, the relay can receive a backhaul signal starting from the fourth OFDM symbol of the special subframe in special subframe. In this case, the relay cannot receive the first DMRS group of the first slot (DMRS REs corresponding to OFDM symbols #2 and #3) (refer to FIG. 22) in the case of configurations #1, #2, #6 and #7 (refer to FIG. 9a). While the relay cannot receive only the DMRS corresponding to OFDM symbol #2 in practice, the DMRS corresponding to OFDM symbol #3 becomes insignificant because DMRSs are spread in OFDM symbols #2 and #3. Accordingly, the DMRSs corresponding to OFDM symbols #2 and #3 of the first slot cannot be used. That is, the corresponding DMRS REs are punctured, and thus R-PDCCH/PDSCH demodulation performance may be deteriorated.

To solve the above-mentioned problem, a method of using the CRS instead of the DMRS can be considered. That is, CRS based R-PDCCH/PDSCH instead of DMRS based R-PDCCH/PDSCH transmission can be performed to solve a problem such as DMRS RE puncturing. To implement this, CRS based R-PDCCH/PDSCH transmission can be performed in a special subframe at all times.

Alternatively, the number of symbols occupied by an RN PDCCH of a relay cell may be fixed to 1 in order to receive DMRS REs. In this case, the relay can receive a backhaul signal starting from OFDM symbol #2 and thus DMRS RE puncturing does not occur. To achieve this, the number of antenna ports used by the relay for CRS transmission can be limited to 1 or 2.

Alternatively, on the assumption that an R-PDCCH carries a DMRS for a single antenna port at all times, the BS and the relay can use a DMRS corresponding to OFDM symbol #3 for channel estimation without spreading the same. This assumption and operations of the BS/relay according thereto can be applied to the corresponding special subframe only.

Alternatively, when the relay receives a backhaul signal (e.g. R-PDCCH/PDSCH) starting from OFDM symbol #3, the DMRS corresponding to OFDM symbol #2 cannot be received and the DMRS corresponding to OFDM symbol #3 becomes useless, as described above. In this case, the BS can map the R-PDCCH/PDSCH to the DMRS RE corresponding to OFDM symbol #3 and the relay can perform decoding on the assumption that the R-PDCCH/PDSCH has been mapped to the DMRS RE. To implement this, the BS can puncture the DMRS corresponding to OFDM symbol #3 and map the R-PDCCH/PDSCH to the punctured position. According to this method, R-PDCCH/PDSCH decoding can be performed using the second and/or third DMRS groups in the corresponding special subframe.

Figure 23:
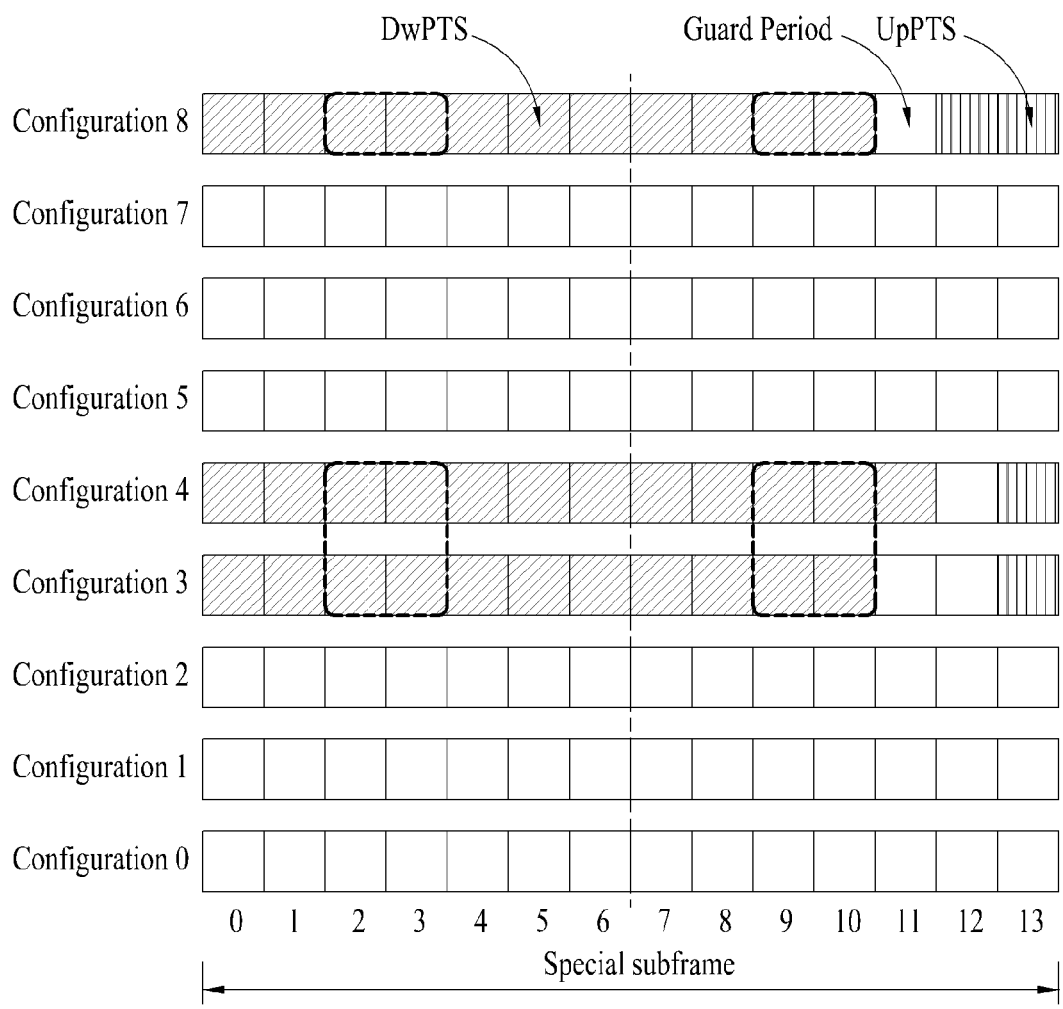

In the case of special subframe configurations #3, #4 and #8 (refer to FIG. 9b), the first DMRS group and the second DMRS groups are spaced apart from each other, as shown in FIG. 23. In this case, if the first DMRS group is not used for channel estimation, R-PDCCH/PDSCH decoding performance and channel estimation performance may be deteriorated. Accordingly, even if the duration of a DwPTS is relatively long (e.g. in special subframe configurations #3, #4 and #8), a DMRS pattern with a short DwPTS duration (e.g. special subframe configurations 1, 2, 6 and 7) can be used.

Embodiment 5: DMRS RE Overhead Supposition

It is not desirable to transmit a PDSCH in the second slot since a small number of available OFDM symbols is present in the second slot in configurations other than configurations #3, #4 and #8. Configurations may be previously set such that the PDSCH is not transmitted in configurations unsuitable for PDSCH transmission. In this case, DMRS RE overhead (or DMRS RE configuration/pattern) supposition can be applied differently from the conventional case. For example, the relay can consider only DMRS port 7 (i.e. rank 1) since a PDSCH is not present in a PRB pair in which an R-PDCCH is detected. A PDSCH is present in a PRB pair in which an R-PDCCH is not detected, which is allocated by a DL grant, and thus the relay can assume DMRS RE overhead (or DMRS RE configuration/pattern) according to a multiple antenna transmission mode. This assumption is different from assumption used for the R-PDCCH in a normal DL subframe, and the relay can detect an R-PDCCH in consideration of only rank-1 transmission in a specific special subframe. Here, the specific special subframe can be set to a backhaul subframe and/or can refer to a special subframe having a specific configuration (e.g. configuration #0, #1, #2, #5, #6 or #7).

Embodiment 6: Operations According to Backhaul Configuration Bitmap Signaling

Embodiments 1 to 5 illustrate cases in which a special subframe is used as a backhaul subframe. Operations of embodiments 1 to 5 can be performed in connection with a special subframe configuration index and/or automatically performed only when a specific special subframe is set to a backhaul subframe. For example, when a specific subframe index corresponds to a special subframe and the special subframe is set to a backhaul subframe, the transmitter/receiver can perform operations according to embodiments 1 to 5. A backhaul subframe can be indicated using a bitmap signal (e.g. N-bitmap signal). The position of each bit in a bitmap indicates the position of a subframe in a radio frame(s) and the value (i.e. 0 or 1) of the corresponding bit can indicate whether the subframe is a backhaul subframe (e.g. an MBSFN subframe) or a normal subframe. Alternatively, the operations of embodiments 1 to 5 can be automatically performed based on backhaul configuration signaling (e.g. N-bitmap signal) or similar signaling when the corresponding special subframe is set to a backhaul subframe.

Figure 24:
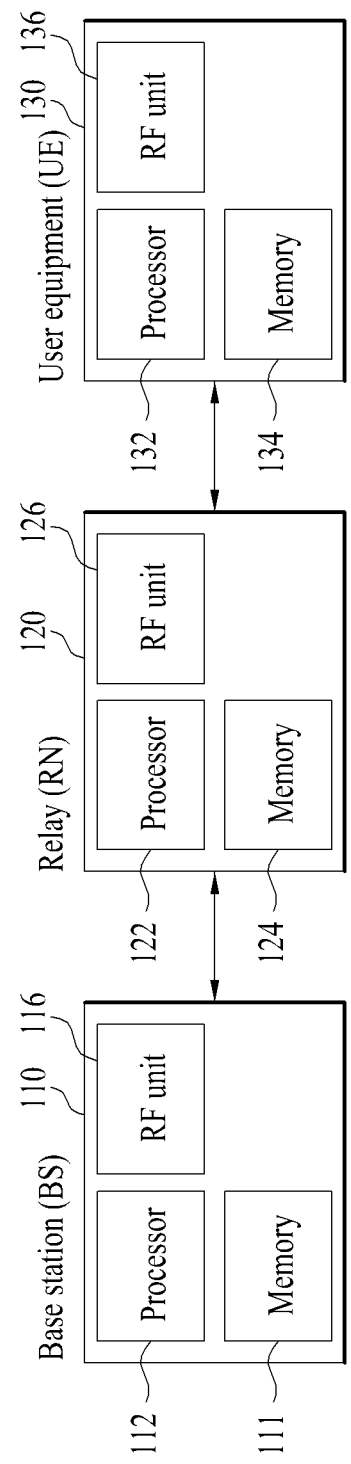
FIG. 24 illustrates a base station (BS), a relay node (RN) and UE applicable to the present invention.

FIG. 24 illustrates a BS, an RN and a UE to which the present invention is applicable.

Referring to FIG. 24, a wireless communication system includes a BS 110, an RN 120 and a UE 130. While the figure shows that UE is connected to the RN for convenience, the UE may be connected to the BS.

The BS 110 includes a processor 112, a memory 114 and an RF unit 116. The processor 112 may be configured to implement the procedures and/or methods proposed by the present invention. The memory 114 is connected to the processor 112 and stores various types of information relating to operations of the processor 112. The RF unit 116 is connected to the processor 112 and transmits and/or receives RF signals. The RN 120 includes a processor 122, a memory 124 and an RF unit 126. The processor 122 may be configured to implement the procedures and/or methods proposed by the present invention. The memory 124 is connected to the processor 122 and stores various types of information related to operations of the processor 122. The RF unit 126 is connected to the processor 122 and transmits and/or receives RF signals. The UE 130 includes a processor 132, a memory 134 and an RF unit 136. The processor 132 may be configured to implement the procedures and/or methods proposed by the present invention. The memory 134 is connected to the processor 132 and stores various types of information related to operations of the processor 132. The RF unit 136 is connected to the processor 132 and transmits and/or receives RF signals. The BS 110, RN 120 and/or UE 130 may have a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a description is given, centering on a data transmission and reception relationship between a BS and a UE. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is used for UE, a BS or other equipment of a wireless communication system. Specifically, the present invention is applicable to a method for transmitting uplink control information and a device therefor.

The invention claimed is:

1. A method for receiving signals by a communication device in a time division duplex (TDD) based wireless communication system, the method comprising:
   receiving a downlink signal via a downlink period in a specific subframe comprising the downlink period, a guard period, and an uplink period,
   wherein each length of the downlink period, the guard period, and the uplink period in the specific subframe is predetermined according to a subframe configuration of the specific subframe; and
   selectively monitoring a physical downlink control channel (PDCCH) according to the subframe configuration of the specific subframe,
   wherein when a normal cyclic prefix (CP) is configured in downlink, the PDCCH is not monitored for subframe configuration #0 or #5, wherein the PDCCH is assigned within a resource region starting from an $N^{th}$ orthogonal frequency division multiplexing (OFDM) symbol in a subframe, and wherein N is an integer of 2 or more.

2. The method of claim 1, wherein when the normal CP is configured in downlink, the PDCCH is monitored for subframe configuration #1 to #4 or #6 to #8.

3. The method of claim 1, wherein when the normal CP is configured in downlink, each length of the downlink period and the uplink period in the specific subframe is given as follows:

| Subframe Configuration | Length of downlink period (the number of OFDM symbols) | Length of uplink period (the number of OFDM symbols) |
| --- | --- | --- |
| 0 | 3 | 1 |
| 1 | 9 | 1 |
| 2 | 10 | 1 |
| 3 | 11 | 1 |
| 4 | 12 | 1 |
| 5 | 3 | 2 |
| 6 | 9 | 2 |
| 7 | 10 | 2 |
| 8 | 11 | 2 | wherein one subframe comprises 14 OFDM symbols.

4. The method of claim 1, wherein the monitoring includes decoding the PDCCH.

5. A communication device used for in a time division duplex (TDD) based wireless communication system, the communication device comprising:
a radio frequency (RF) unit; and
a processor, wherein the processor is configured to:
receive, through the RF unit, a downlink signal via a downlink period in a specific subframe comprising the downlink period, a guard period, and an uplink period, wherein each length of the downlink period, the guard period, and the uplink period in the specific subframe is predetermined according to a subframe configuration of the specific subframe, and
selectively monitor a physical downlink control channel (PDCCH) according to the subframe configuration of the specific subframe, wherein when a normal cyclic prefix (CP) is configured in downlink, the PDCCH is not monitored for subframe configuration #0 or #5, wherein the PDCCH is assigned within a resource region starting from an $N^{th}$ orthogonal frequency division multiplexing (OFDM) symbol in a subframe, and wherein N is an integer of 2 or more.

6. The communication device of claim 5, wherein when the normal CP is configured in downlink, the PDCCH is monitored for subframe configuration #1 to #4 or #6 to #8.

7. The communication device of claim 5, wherein when the normal CP is configured in downlink, each length of the downlink period and the uplink period in the specific subframe is given as follows:

| Subframe Configuration | Length of downlink period (the number of OFDM symbols) | Length of uplink period (the number of OFDM symbols) |
| --- | --- | --- |
| 0 | 3 | 1 |
| 1 | 9 | 1 |
| 2 | 10 | 1 |
| 3 | 11 | 1 |
| 4 | 12 | 1 |
| 5 | 3 | 2 |
| 6 | 9 | 2 |
| 7 | 10 | 2 |
| 8 | 11 | 2 | wherein one subframe comprises 14 OFDM symbols.

8. The communication device of claim 5, wherein the monitoring includes decoding the PDCCH.

* * * * *